US011145295B1

(12) United States Patent
Kurhekar et al.

(10) Patent No.: US 11,145,295 B1
(45) Date of Patent: Oct. 12, 2021

(54) NATURAL LANGUAGE COMMAND ROUTING

(71) Applicant: Amazon Technologies, Inc., Seattle, WA (US)

(72) Inventors: Shantanu Vikas Kurhekar, Redmond, WA (US); Amit Mittal, Redmond, WA (US); Michael Donikian, Winchester, MA (US); Yupeng Xie, Bothell, WA (US); Richard T Koehler, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 168 days.

(21) Appl. No.: 16/592,277

(22) Filed: Oct. 3, 2019

(51) Int. Cl.
*G10L 15/183* (2013.01)
*G10L 15/18* (2013.01)
*G10L 15/30* (2013.01)
*G10L 15/22* (2006.01)
*G10L 13/00* (2006.01)

(52) U.S. Cl.
CPC .......... *G10L 15/1815* (2013.01); *G10L 13/00* (2013.01); *G10L 15/22* (2013.01); *G10L 15/30* (2013.01); *G10L 2015/223* (2013.01)

(58) Field of Classification Search
CPC .................................................. G10L 15/00–34
See application file for complete search history.

(56) References Cited

U.S. PATENT DOCUMENTS

| 10,572,476 | B2* | 2/2020 | Skinder | G06F 16/24534 |
| 10,838,779 | B1* | 11/2020 | Yue | G06F 3/0484 |
| 2010/0161313 | A1* | 6/2010 | Karttunen | G06F 40/289 704/9 |
| 2016/0148612 | A1* | 5/2016 | Guo | G06F 40/237 704/257 |
| 2021/0104235 | A1* | 4/2021 | Radtke | G10L 15/1822 |

* cited by examiner

Primary Examiner — Abul K Azad
(74) Attorney, Agent, or Firm — Pierce Atwood LLP

(57) ABSTRACT

Techniques for improving routing of natural language inputs, of a natural language processing (NLP) system, are described. A natural language input may be routed based on the device that captured the natural language input. A device manufacturer, hospitality provider, business, etc. may cause the NLP system to generate a skill component specific to the device manufacturer, hospitality provider, business, etc. Thereafter, when a natural language input is received from the device, the NLP system may route the natural language input to the device manufacturer-, hospitality provider-, business-, etc.-specific skill component for processing.

20 Claims, 19 Drawing Sheets

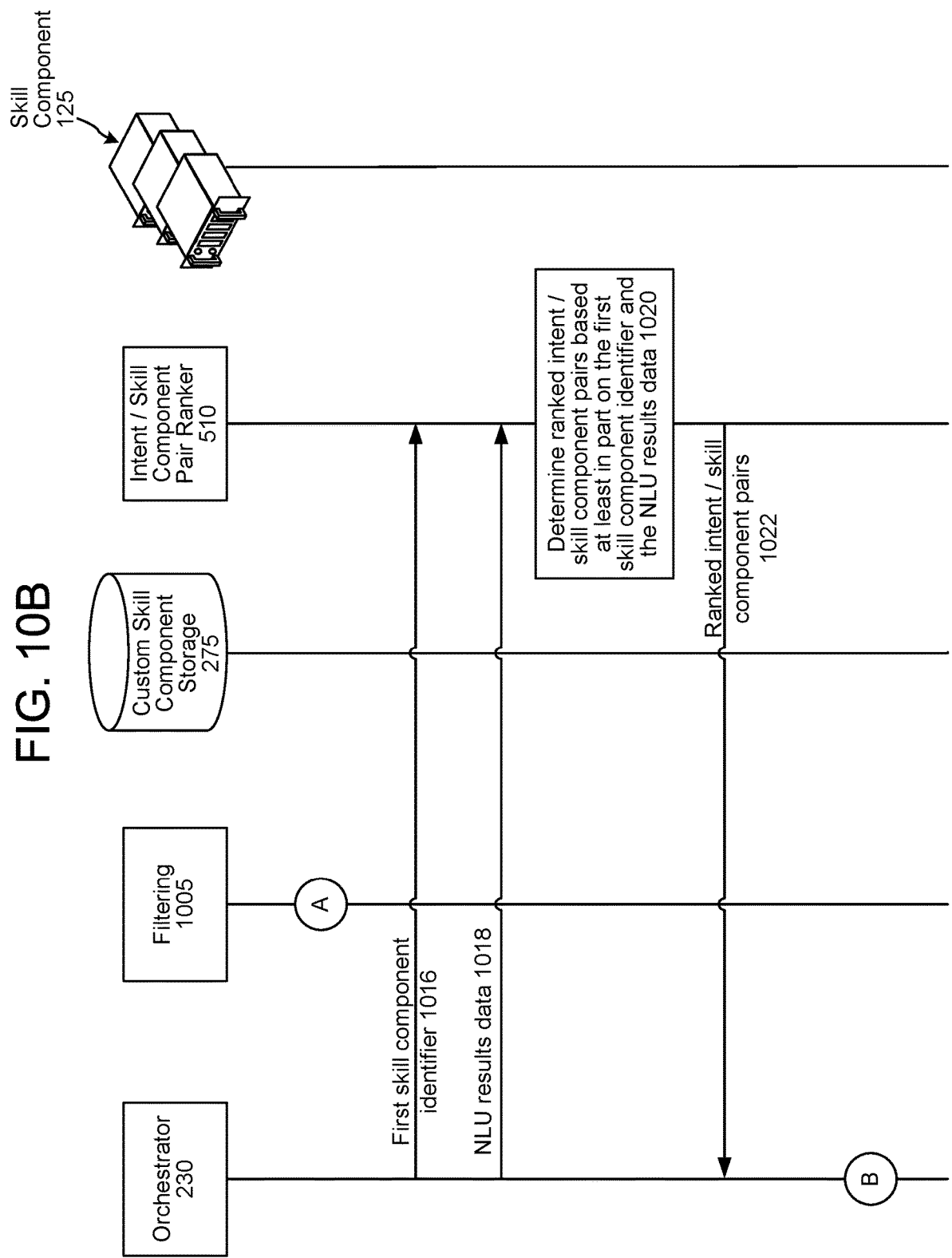

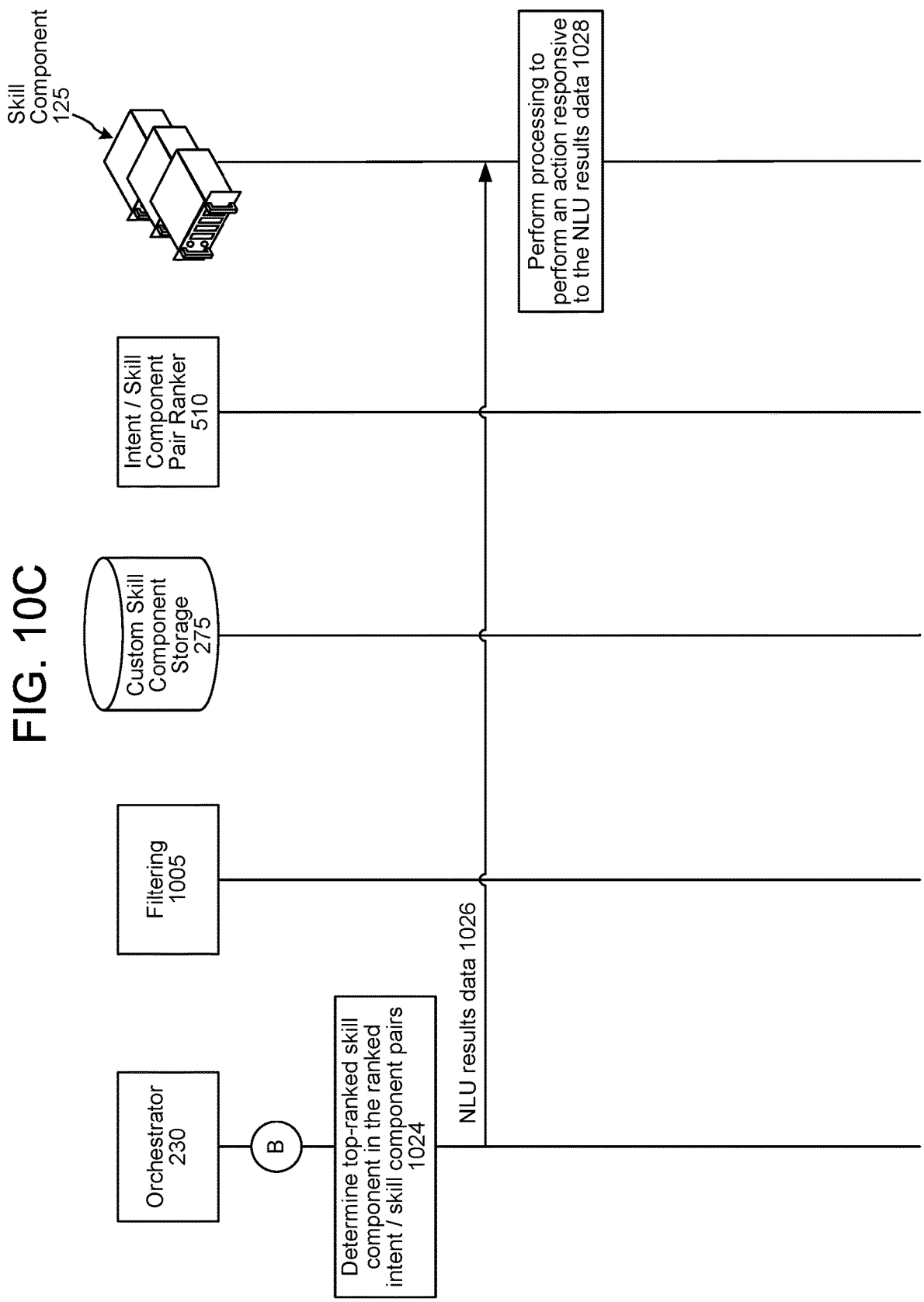

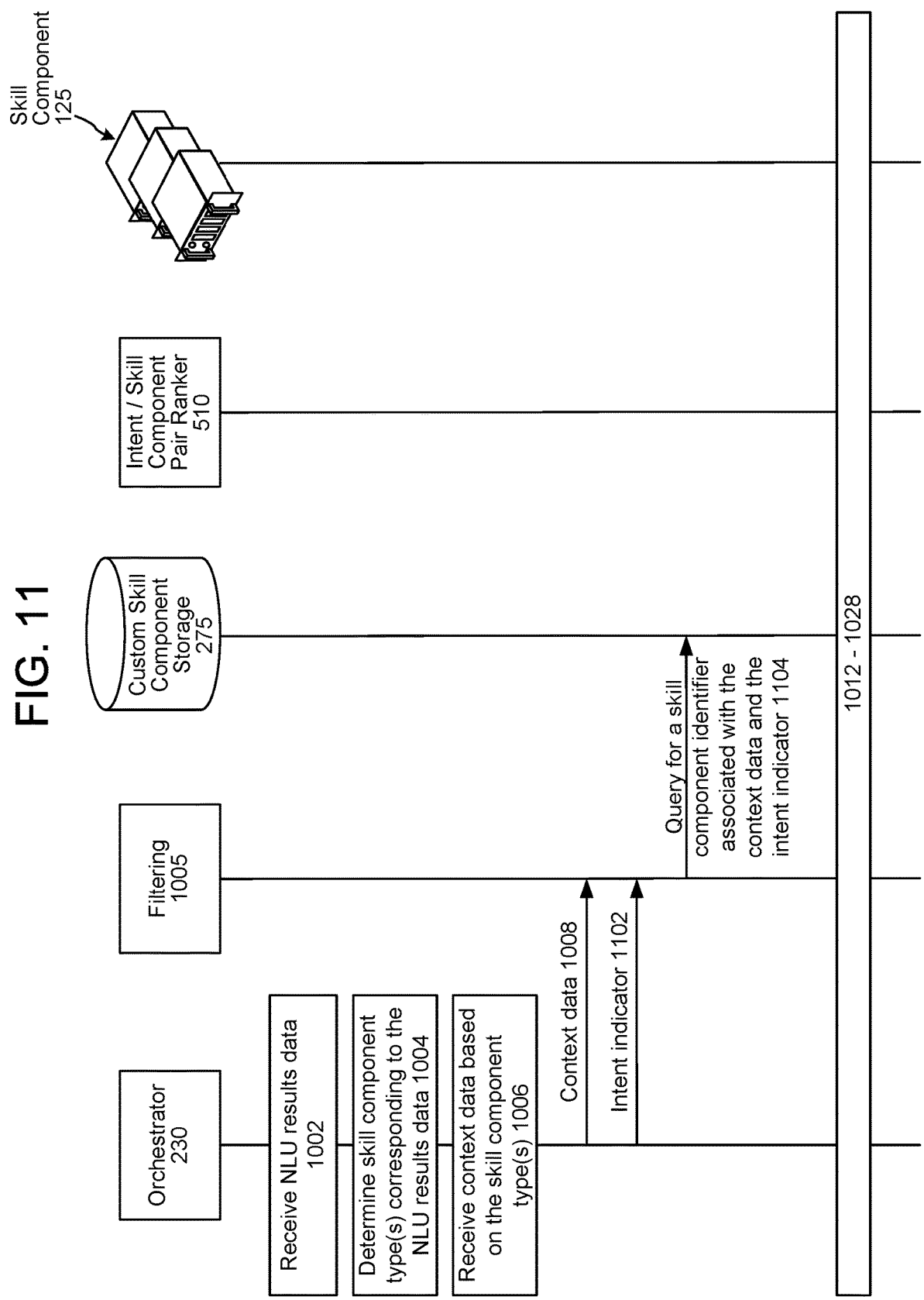

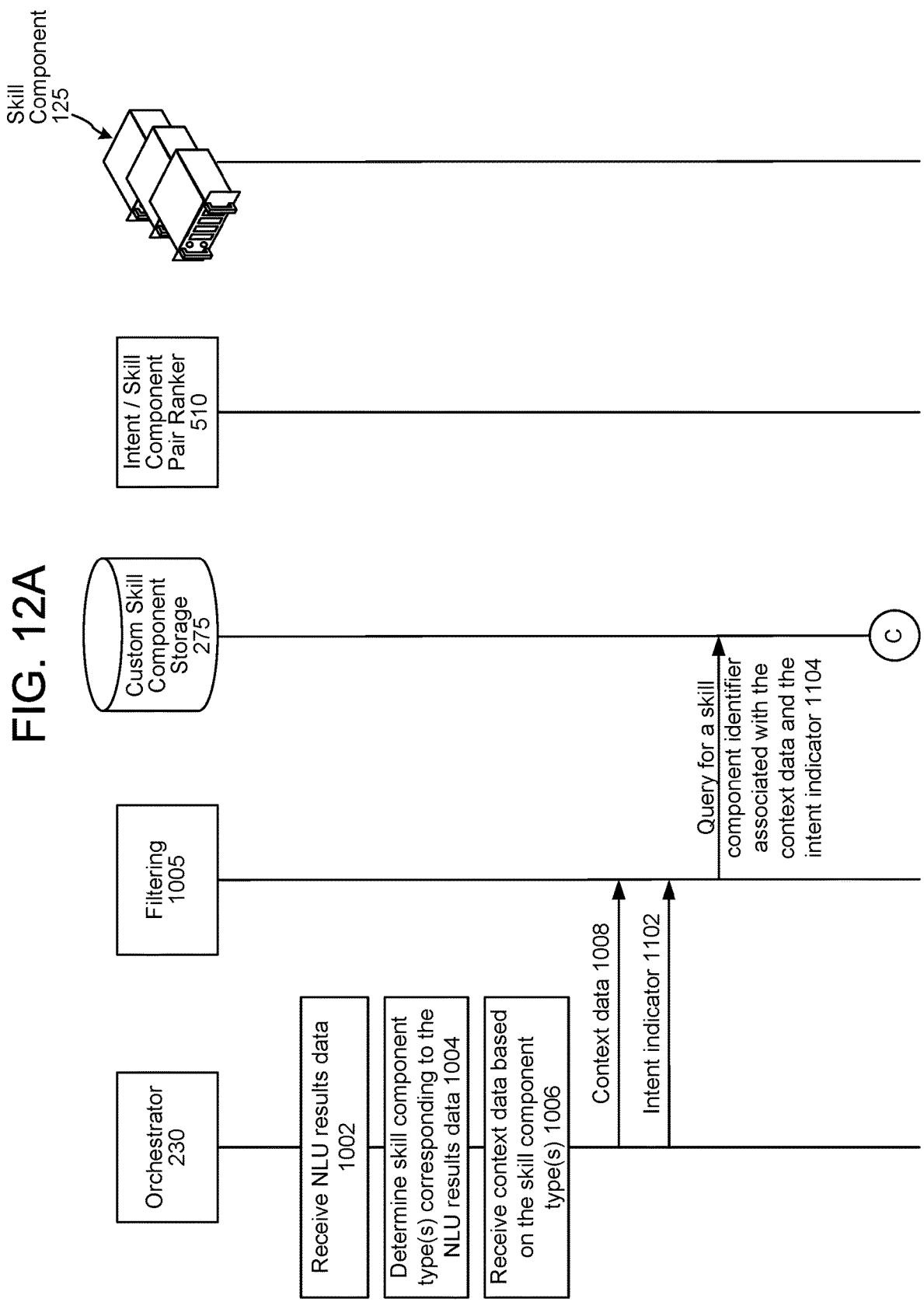

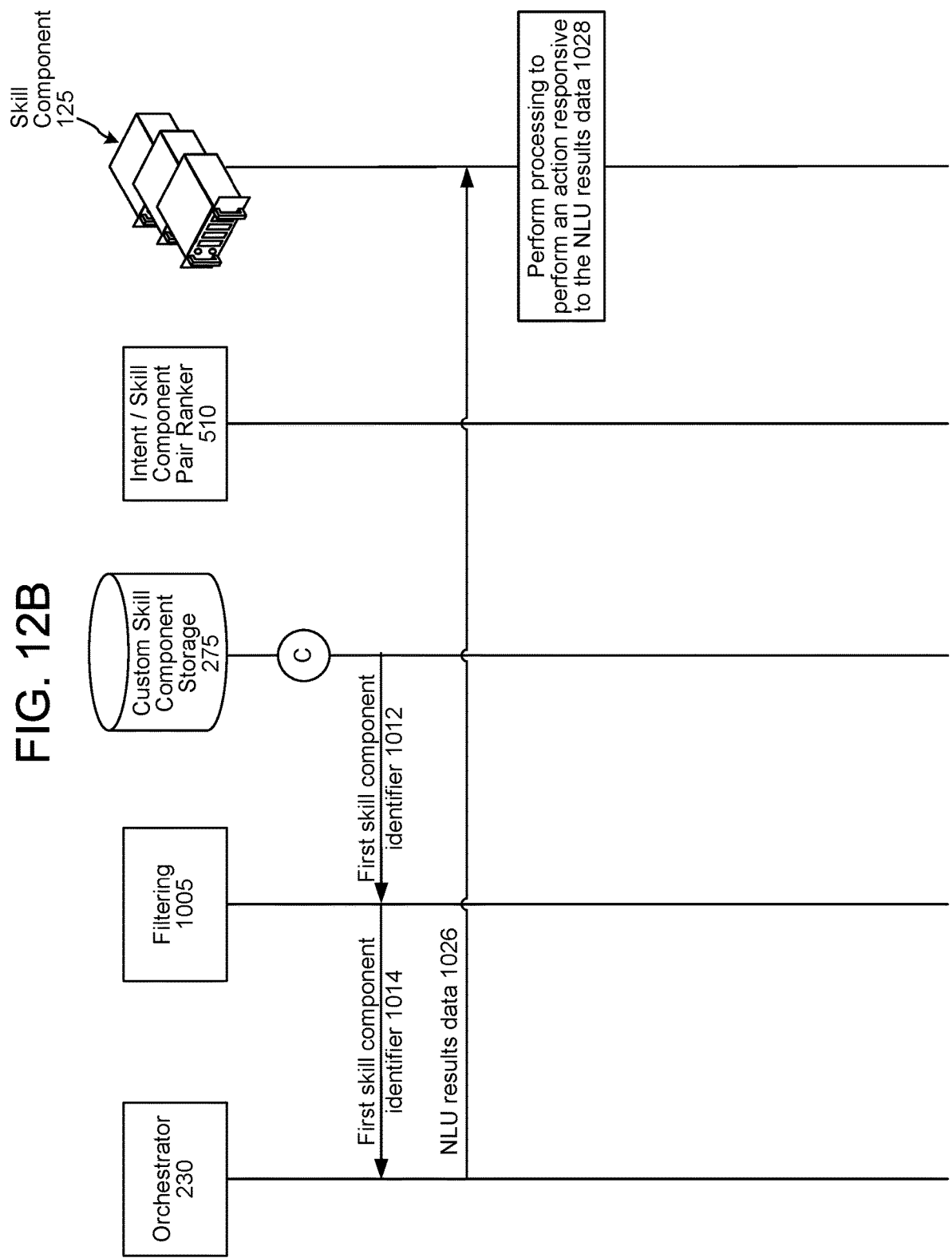

NATURAL LANGUAGE COMMAND ROUTING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 10A through 10C are a signal flow diagram illustrating processing that may be performed, after natural language understanding (NLU) processing, when a custom skill component storage includes context data associated with a skill component identifier, but not at least one intent, in accordance with embodiments of the present disclosure.

FIG. 11 is a signal flow diagram illustrating processing that may be performed, after NLU processing, when a custom skill component storage includes context data associated with a skill component identifier and at least one intent, in accordance with embodiments of the present disclosure.

FIGS. 12A and 12B are a signal flow diagram illustrating processing that may be performed, after NLU processing, when a custom skill component storage includes context data associated with a skill component identifier and at least one intent, in accordance with embodiments of the present disclosure.

DETAILED DESCRIPTION

Figure 1:
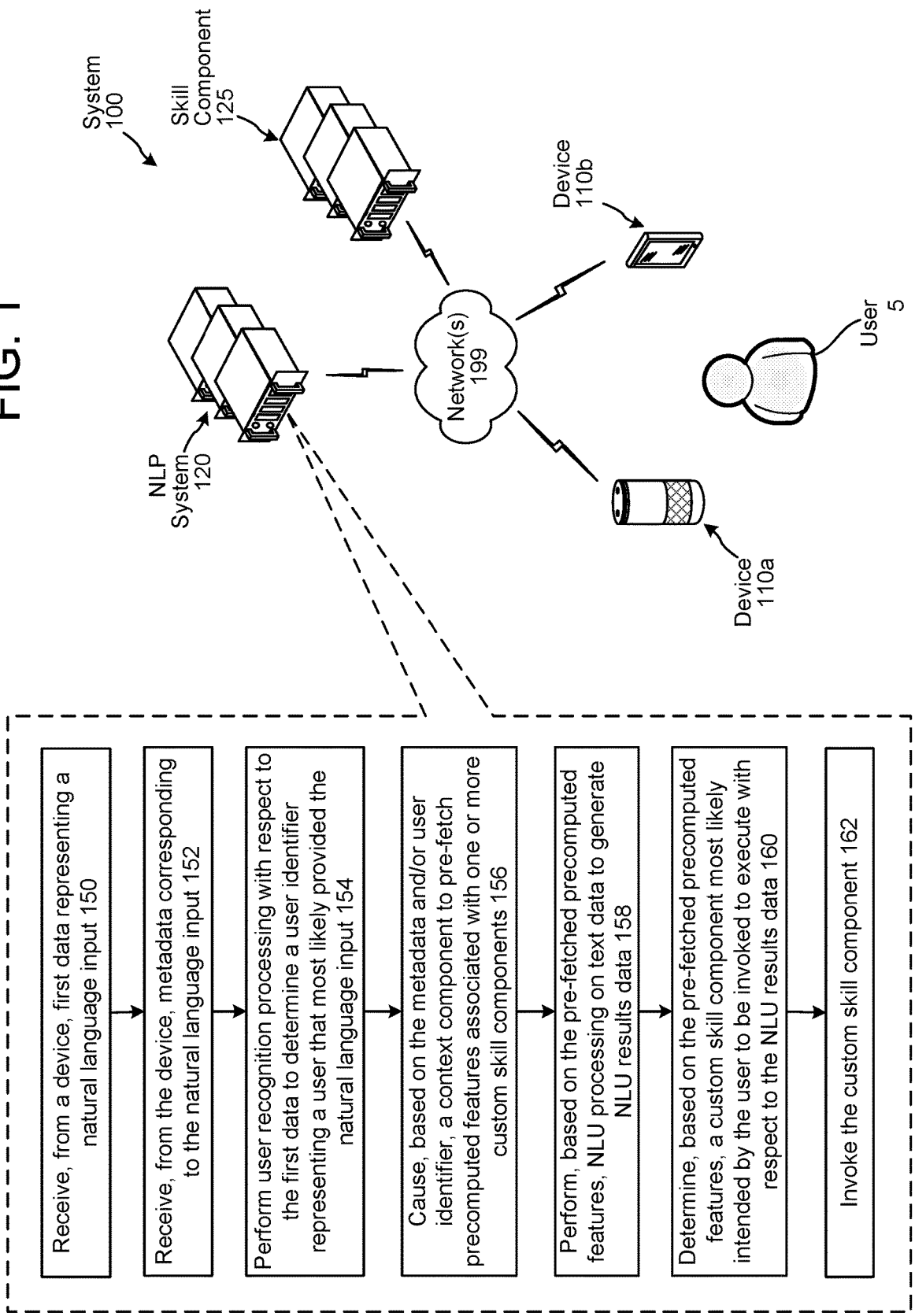
FIG. 1 is a conceptual diagram illustrating a system configured to respond to natural language inputs, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A natural language processing (NLP) system may cause skill components to perform actions in response to natural language inputs (e.g., spoken inputs and/or typed inputs). For example, for the natural language input "order towels," a first skill component may be invoked to order more towels from room service of a hotel, whereas a second skill component may be invoked to purchase more towels for delivery to a user's home. For further example, for the natural language input "what is the next item in today's itinerary," a first skill component may be invoked to determine a next item in a user's electronic calendar, whereas a second skill component may be invoked to determine a next item in an electronic calendar associated with a conference room within which the device (that captured the natural language input) is located. In the foregoing examples, actions correspond to the ordering of towels, purchasing of towels, and determining of next calendar items. As such, as used herein, an "action" may refer to some result of a skill component's processing.

In at least some examples, the same action may be performed in response to a natural language input, regardless of context (e.g., the device that captured the natural language input and/or the user that provided the natural language input). For example, for the natural language input "order more towels," a NLP system may invoke a shopping skill component to purchase towels from an electronic shopping system. While the type and/or number of towels may be configured based on user preferences, the overall experience of the shopping skill component being invoked to purchase towels may be maintained across devices and/or users.

The present disclosure improves a NLP system by enabling the NLP system to tailor the action, performed in response to a natural language input, such that an action, performed in response to a natural language input at a first device by a first user, is different from an action performed in response to the natural language input at a second device and/or by a second user.

Such tailoring may be performed using context data stored by a context component of the NLP system. Context data may relate to a context of the device that receives a natural language input. Such device context data may include, but is not limited to, who owns the device, who manages the device, who manufactured the device, and device location. Context data may additionally or alternatively relate to a context of the user that provides a natural language input. Such user context data may include, but is not limited to, whether the user is the registered owner of the device that received the natural language input.

In view of the foregoing, for example, a hotel may create a skill component to be invoked by a NLP system in response to one or more natural language inputs (such as natural language inputs requesting more towels, natural language inputs asking about dining near the hotel, natural language inputs asking when a pool of the hotel is open, etc.). The hotel may also purchase a speech-controlled device associated with a NLP system, and place the speech-controlled device in a room of the hotel. The hotel may provide the NLP system with information representing the speech-controlled device is owned by the hotel and located in a room of the hotel. The NLP system may, in turn, store context data for the skill component (generated for the hotel), in which the context data represents the skill component is associated with the speech-controlled device is owned by the hotel, and is also associated with a location corresponding to the hotel room. In this example, the location may be represented by a wifi network to which devices may connect when the devices are in the hotel room.

Thereafter, as an example, when the NLP system receives data representing a natural language input received by the speech-controlled device owned by the hotel, the NLP system may identify the context data associated with the hotel's skill component based on the hotel's skill component being associated with the hotel owned speech-controlled device. As a further example, a guest of the hotel room may bring their own speech-controlled device and set up same in the hotel room. The guest may speak a natural language input to their device, which may be sent to the NLP system along with data representing a wifi network to which the guest's speech-controlled device is connected. The NLP system may identify the context data associated with the hotel's skill component based on the wifi network information (that accompanied the natural language input) being associated with hotel's skill component.

Continuing the foregoing example, the natural language input may correspond to "order me towels." In the situation where the natural language input was received the guest's device that the guest placed in the hotel room, without teachings of the present disclosure (i.e., without determining the hotel skill component based on the context data, the NLP system may invoke a shopping skill component to purchase towels, from an electronic shopping system, for delivery to the guest's home (as represented in the guest's user profile stored by the NLP system). However, since the NLP system was able to identify the hotel's skill component based on the wifi network information, the NLP system (according to the present disclosure), may instead invoke the hotel's skill component to invoke room service functionality to have additional towels delivered to the hotel room in which the guest's device (that captured the natural language input) is located. Other examples of dynamic skill component arbitration and routing are possible, such as but not limited to other examples provided herein.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to respond to natural language inputs. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b), local to a user 5, a NLP system 120, and a skill component 125 that communicate across the one or more networks 199. While the user 5 is illustrated as being a human, other types of users (e.g., computing systems) may exist.

The device 110a may receive audio corresponding to a spoken natural language input originating from the user 5. The device 110a may generate audio data corresponding to the audio and may send the audio data to the NLP system 120. Alternatively, the device 110b may receive a typed natural language input from the user 5. The device 110b may generate text data corresponding to the typed input and may send the text data to the NLP system 120.

The device 110 may send the audio data and/or the text data to the NLP system 120 via an application that is installed on the device 110 and associated with the NLP system 120. An example of such an application is the Amazon Alexa application that may be installed on a smart phone, tablet, or the like.

The NLP system 120 may receive (150) first data representing the natural language input. The first data may be audio data or text data sent from the device 110a or 110b, respectively.

The NLP system 120 may also receive metadata (152) corresponding to the natural language input. Example metadata includes, but is not limited to, a device identifier representing the device (110a/110b) that received the natural language input, a wakeword spoken to "wake" the device 110a for purposes of capturing the natural language input, a wifi network to which the device (110a/110b) is connected, and geographic [e.g., global positioning system (GPS)] location information representing a geographic location of the device (110a/110b) when the device (110a/110b) received the natural language input.

The NLP system 120 may perform (154) user recognition processing with respect to the first data to determine a user identifier representing a user that most likely provided the natural language input. For example, if the first data is audio data, the NLP system 120 may perform speaker recognition processing to determine a user identifier of a user whose stored speech characteristics most closely correspond to speech characteristics representing the spoken natural language input.

The NLP system 120 may cause (156) a context component to pre-fetch precomputed features associated with one or more custom skill components based on the metadata and/or the user identifier. As used herein a "precomputed feature" may refer to a static feature such as a skill identifier representing a custom skill component corresponding to the metadata and/or user identifier. A precomputed feature may alternatively be dynamic in that the precomputed feature may be computed at runtime after the NLP system 120 receives the metadata and/or determines the user identifier. For example, after determining the user identifier, the context component may determine the user is a registered owner of a custom skill component based on the user identifier specifically being associated with the custom skill component. For further example, after receiving metadata representing a device identifier, and after determining a user identifier, the context component may determine a custom skill component specifically associated with the device identifier, and may generate a precomputed feature representing the user is not the registered owner of the custom skill component (e.g., in a situation where the custom skill component is a hotel's skill component tied to the device 110).

As used herein, a "custom skill component" may refer to a skill component that is associated with one or more particular pieces of context information.

In at least some examples, a custom skill component may be associated with one or more particular device identifiers. In furtherance of the above hotel example, a human associated with the hotel (e.g., an employee of the hotel) may cause the NLP system to associate a device identifier, of a speech-controlled device placed in a hotel room, to be associated with the hotel's skill component identifier. In this example, the hotel's skill component may be considered a custom skill component specifically associated with the device identifier of the speech-controlled device placed in the hotel room.

In at least some examples, a custom skill component may be associated with one or more user identifiers. The NLP system 120 may provide functionality for a user thereof to generate a skill component having functionality created by the user. For example, a user may provide the NLP system 120 with an action to be performed and one or more sample user inputs that may be used to invoke the action. Using the user-provided data, the NLP system 120 may generate a skill component (corresponding to software, hardware, and/or firmware configured to process NLU results data corresponding to the sample user inputs to perform the action) and may associate the skill component with a user identifier (corresponding to the user), resulting in the created skill component being a custom skill component specifically associated with the user's identifier.

In at least some examples, a custom skill component may be associated with a specific wakeword spoken to a device 110 prior to a command. In furtherance of the above hotel example, a human associated with the hotel (e.g., an employee of the hotel) may cause the NLP system to associate a particular wakeword (e.g., configured to wake a device from a "sleep" state for the purpose of inputting a spoken natural language input) to be associated with the hotel's skill component identifier. In this example, the hotel's skill component may be considered a custom skill component specifically associated with the wakeword.

In at least some examples, a custom skill component may be associated with a geographic location. In furtherance of the above hotel example, a human associated with the hotel (e.g., an employee of the hotel) may cause the NLP system to associate the hotel's skill component identifier with global positioning system (GPS) coordinates corresponding to the hotel. In this example, the hotel's skill component may be considered a custom skill component specifically associated with the GPS coordinates.

A custom skill component may be associated with more than one type of context. For example, in accordance with the foregoing, a hotel's custom skill component may be associated with two or more of a device identifier, a wakeword, and GPS coordinates.

In at least some examples, a portion of a custom skill component may correspond to functionality provided by a non-custom skill component (e.g., a skill component not tied to a particular device identifier, user identifier, wifi network GPS coordinates, wakeword, etc.). For example, the NLP system 120 may communicate with a taxi skill component configured to book rides for users of the NLP system 120. A hotel's custom skill component may include a portion corresponding to the taxi skill component such that the taxi skill component may be invoked when contextual data indicates the hotel's custom skill component is to be invoked.

The NLP system 120 may, based on the pre-fetched precomputed features, perform (154) NLU processing on the text data to generate NLU results data representing the natural language input (e.g., including an intent and one or more resolved entities, as described in further detail herein).

The NLP system 120 may, based on the pre-fetched precomputed features, determine (160) a custom skill component most likely intended by the user to be invoked with respect to the NLU results data. For example, a user may speak the natural language input "order me towels" to the user's device, which is located in a hotel room of a hotel having a hotel custom skill component. The NLP system 120 may be configured to invoke the hotel's custom skill component and a shopping skill component in response to the natural language input. Based on a pre-fetched precomputed feature representing the device is associated with a GPS location corresponding to the hotel (and/or a pre-fetched precomputed feature representing the device is connected to a wife network corresponding to the hotel), the NLP system 120 may determine the user intended the hotel's custom skill component to be invoked to order more towels from the hotel's room service system, rather than invoke the shopping skill component to purchase more towels for delivery to the user's home.

Thereafter, the NLP system 120 may invoke (162) the determined custom skill component.

As described above, the NLP system 120 may determine context data for resolving which custom skill component is to be used to respond to a natural language input. Custom skill components may be associated with different types. Example custom skill component types include, but are not limited to, device manufacturer-generated custom skill components, business entity-generated custom skill components, and user-generated custom skill components. For example, a device manufacturer-generated custom skill component may be specifically associated with one or more device identifiers (representing one or more devices manufactured by the device manufacturer), and/or associated with a wakeword corresponding to the device manufacturer (which a user may speak prior to a command to intentionally invoke the device manufacturer's custom skill component). For further example, a business entity-generated custom skill component may be associated with one or more device identifiers (representing one or more devices marked as being owned by the business entity), and/or associated with a wakeword corresponding to the business entity (which a user may speak prior to a command to intentionally invoke the business entity's custom skill component), and/or associated with GPS coordinates (representing a geographic location corresponding to the business entity). For further example, a user-generated skill component may be associated with one or more device identifiers (representing one or more devices marked as being owned by the user), and/or associated with a user identifier corresponding to the user, and/or associated with a wakeword (which the user may speak prior to a command to intentionally invoke the user's custom skill component). In at least some examples, more than type of custom skill component may potentially be invoked in response to a same natural language input. At runtime, the NLP system 120 may determine pre-fetched precomputed features for the multiple custom skill components that may be invoked, and use the pre-fetched precomputed features to resolve which of the custom skill components is actually to be invoked for responding to the natural language input.

In at least some examples, a device manufacturer-, business entity-, and/or user-generated custom skill component may include functionality of an already generated skill component (e.g., "public" functionality that is available to various users of the NLP system 120) in addition to device manufacturer-, business entity-, and/or user-provided functionality. For example, a business entity-generated custom skill component may include smart home functionality (corresponding to an already generated smart home skill component) in addition to business entity-provided functionality. For further example, a user-generated custom skill component may include music functionality (corresponding to an already generated music skill component) in addition to user-provided functionality. In such examples, the device manufacturer-, business entity-, and/or user-generated custom skill component may be considered as being "built on top" of the already generated skill component.

Figure 2:
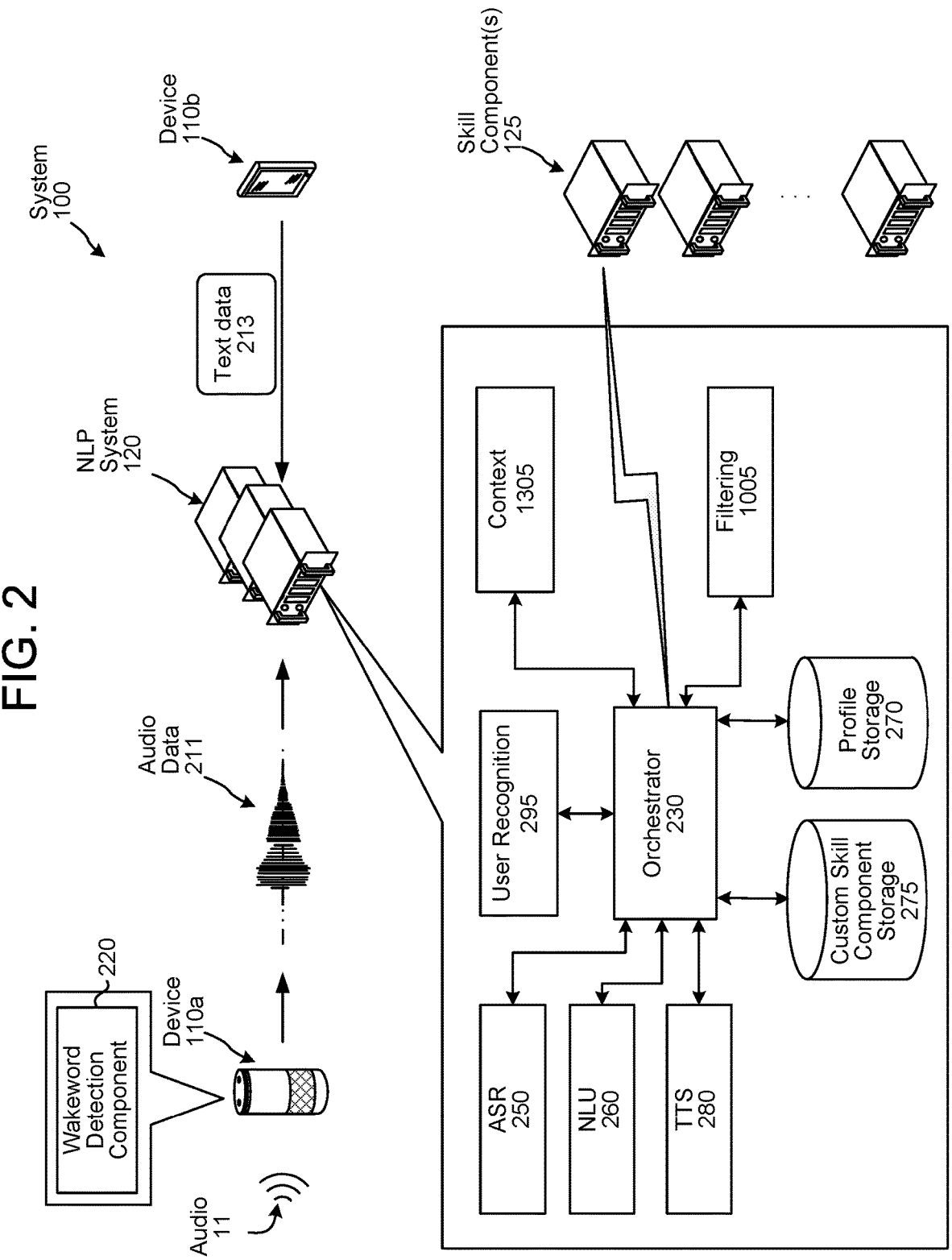
FIG. 2 is a conceptual diagram of components of the system, in accordance with embodiments of the present disclosure.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the NLP system 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HM:Ms for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the NLP system 120. The audio data 211 may include data corresponding to the detected wakeword, or the device 110a may remove the portion of the audio corresponding to the detected wakeword prior to sending the audio data 211 to the NLP system 120.

The NLP system 120 may include an orchestrator component 230 configured to receive the audio data 211 from the device 110a. The orchestrator component 230 may send the audio data 1511 to a user recognition component 295.

The user recognition component 295 may recognize one or more users using various data. The user recognition component 295 may take as input the audio data 211 and/or text data 213 output from the device 110b. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the NLP system 120 in correlation with a natural language input, to stored biometric data of users. The user recognition component 295 may additionally or alternatively perform user recognition by comparing image data (e.g., including a representation of at least a feature of a user), received by the NLP system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of a N-best list) with respective values representing likelihoods of respective users originating the natural language input. The output of the user recognition component 295 may be used to inform NLU processing, processing performed by a skill component 125, as well as processing performed by other components of the NLP system 120 and/or other systems.

The orchestrator component 230 may send additionally send the audio data 211 to an ASR component 250. The ASR component 250 transcribes the audio data 211 into ASR results data (e.g., text data) include one or more ASR hypotheses (e.g., in the form of a N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 may interpret the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 may send the ASR results data to the orchestrator component 230.

The device 110b may receive a typed natural language input. The device 110b may generate text data 213 representing the typed natural language input. The device 110b may send the text data 213 to the NLP system 120, where the text data 213 is received by the orchestrator component 230.

The orchestrator component 230 may send text data (e.g., ASR results data output by the ASR component 250 or the received text data 213) to a NLU component 260.

The NLU component 260 attempts to make a semantic interpretation of the phrase(s) or statement(s) represented in natural language text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the NLP system 120, a skill component 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent. The NLU component 260 may output NLU results data (which may include tagged text data, indicators of intent, etc.).

As described above, the NLP system 120 may perform speech processing using two different components (e.g., the ASR component 250 and the NLU component 260). One skilled in the art will appreciate that the NLP system 120, in at least some examples, may implement a spoken language understanding (SLU) component that is configured to process the audio data 211 to generate NLU results data.

In at least some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In at least some examples, the SLU component outputs a most likely NLU hypothesis, or multiple NLU hypotheses in the form of a N-best list with individual NLU hypotheses corresponding to confidence scores or other scores (such as probability scores, etc.).

Figure 3:
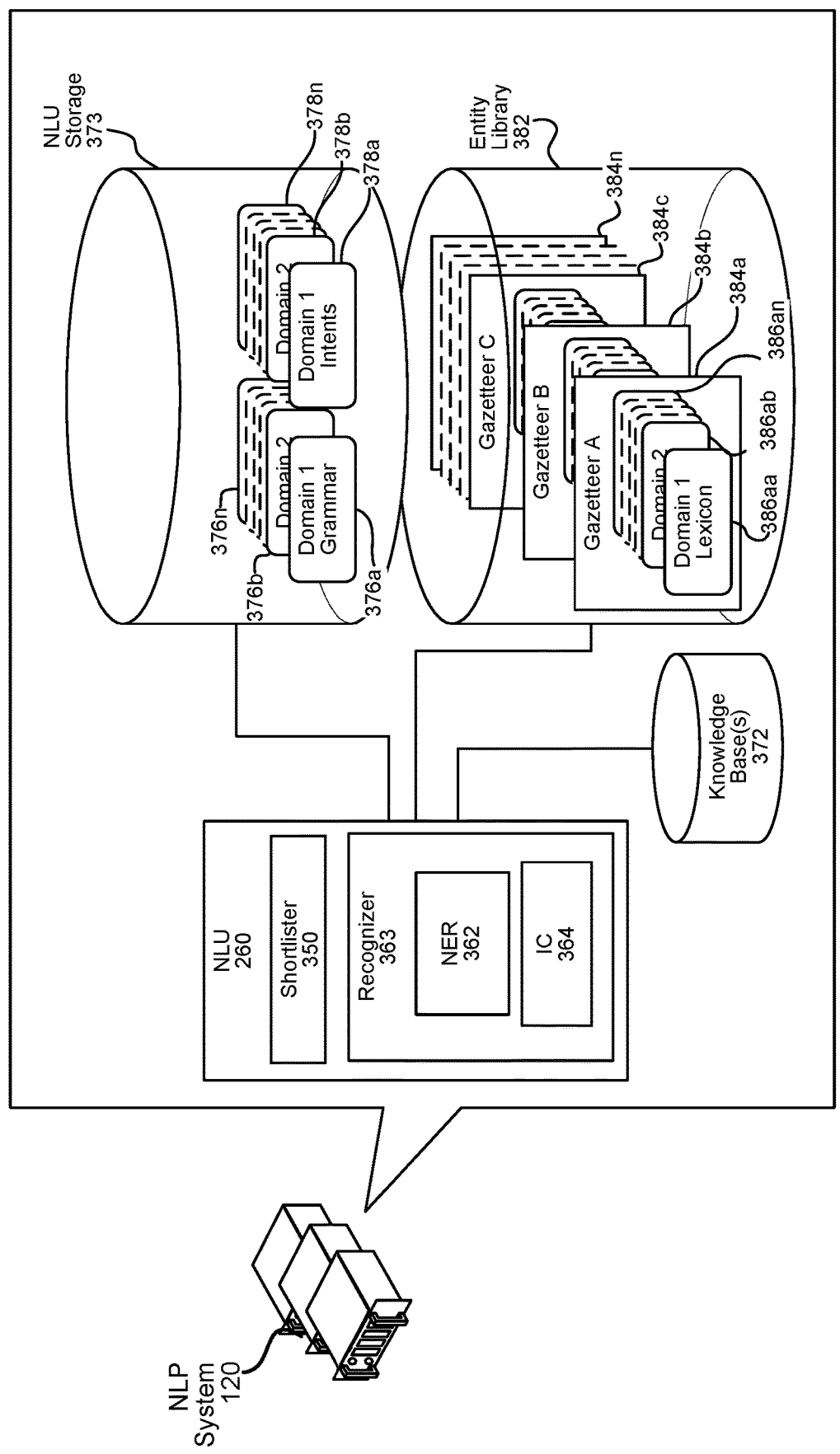
FIG. 3 is a conceptual diagram of how natural language processing is performed, in accordance with embodiments of the present disclosure.

FIG. 3 illustrates how NLU processing may be performed. The NLU component 260 may process text data either output by ASR processing or as received from the device 110b. With respect to ASR generated text data, the NLU component 260 may process a single ASR hypothesis or multiple ASR hypotheses.

The NLU component 260 may include a shortlister component 350. The shortlister component 350 selects domains that likely correspond to the natural language input. As used herein, a "domain" may refer to a grouping of like functionality provided by the NLP system 120 (e.g., a grouping of skill components that provide like functionality). Example domains include smart home, music, video, flash briefing, shopping, and custom (e.g., functionality that is not associated with any pre-configured domain). Without a shortlister component 350, the NLU component 260 may process a given ASR hypothesis with respect to every domain of the NLP system 120, either in parallel, in series, or using some combination thereof. The shortlister component 350 thus limits downstream, more resource intensive NLU processes from being performed with respect to domains that are unlikely to correspond to the natural language input. This reduces total compute power and latency attributed to NLU processing.

The shortlister component 350 may include one or more trained models. The model(s) may be trained to recognize various forms of natural language inputs that may be received by the NLP system 120. For example, during a training period, a skill component 125, corresponding to a domain, may provide the NLP system 125 with training text data representing sample natural language inputs that may be provided by a user to invoke the skill component 125 (i.e., samples natural language inputs that correspond to the domain to which the skill component 125 corresponds). For example, a taxi skill component may provide the NLP system 120 with training text data corresponding to "get me a cab to [location]," "get me a ride to [location]," "book me a cab to [location]," "book me a ride to [location]," etc.

The NLP system 120 may query a skill component 125, corresponding to a domain, regarding whether other natural language input structures are permissible, with the other natural language input structures being generated by the NLP system 120. The NLP system 120 may derive the other natural language input structure(s) using one or more trained models.

A skill component 125 may also provide the NLP system 120 with training text data indicating grammar and annotations.

The NLP system 120 may use the training text data representing the sample natural language input(s), the NLP system-determined related natural language input structure(s), the grammar, and/or the annotations to train a model that may determine when a natural language input is likely to correspond to a domain. The NLP system 120 may use the sample natural language inputs, provided by skill component 125, and related sample natural language inputs, generated by the NLP system 120, as binary examples to train a model associated with a domain corresponding to the skill component 125. For example, some sample natural language inputs may be positive examples (e.g., natural language inputs that correspond to the domain). Other sample natural language inputs may be negative examples (e.g., natural language inputs that do not correspond to the domain).

The shortlister component 350 may implement more than one trained model, with each trained model being trained with respect to a different domain.

In at least some examples, the shortlister component 350 may implement a single trained model. The single trained model may include domain-specific portions, with each domain-specific portion being trained with respect to skill components 125 of a different domain. Implementing a single model with domain-specific portions may result in less latency than implementing a different trained model for each domain.

Training the shortlister component 350 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. In at least some examples, each recognizer 363 may be associated with a different domain.

If the shortlister component 350 determines text data (either received from the device 11*b* or corresponding to an ASR hypothesis) is potentially associated with multiple domains, the recognizers 363 associated with the domains may be invoked to process the text data. The selected recognizers 363 may process the text data in parallel, in series, partially in parallel, etc. For example, if text data potentially corresponds to both a communications domain and a music domain, a recognizer associated with the communications domain may process the text data in parallel, or partially in parallel, with a recognizer associated with the music domain processing the text data.

The NLU component 260 may communicate with various storages. The NLU component 260 may communicate with a NLU storage 273, which includes domain grammars (376*a*-376*n*), representing how natural language inputs may be formulated to invoke respective domains, and domain intents (378*a*-378*n*) representing intents supported by respective domains.

Each recognizer 363 may include a named entity recognition (NER) component 362. A NER component 362 attempts to identify grammars and lexical information that may be used to construe meaning with respect to text data input therein. A NER component 362 identifies portions of text data that correspond to a named entity that may be recognizable by the NLP system 120. A NER component 362 may also determine whether a word refers to an entity that is not explicitly mentioned in the text, for example "him," "her," "it" or other anaphora, exophora or the like.

Each recognizer 363, and more specifically each NER component 362, may be associated with a particular grammar 376, a particular intent(s) 378, and a particular personalized lexicon 386 (stored in an entity library 382). A gazetteer 384 may include domain-indexed lexical information associated with a particular user. For example, Gazetteer A (384*a*) may include domain-indexed lexical information 386*aa* to 386*an*. A user's music domain lexical information might include album titles, artist names, and song names, for example, whereas a user's contact list domain lexical information might include the names of contacts. Since every user's music collection and contact list is presumably different, this personalized information may improve entity resolution.

A NER component 362 applies grammar models 376 and lexical information 386 associated with a domain to determine a mention of one or more entities in text data input therein. In this manner, a NER component 362 identifies "slots" (i.e., particular words in text data) that may be needed for later processing. A NER component 362 may also label each slot with a type (e.g., noun, place, city, artist name, song name, etc.).

Each grammar model 376 may include the names of entities (i.e., nouns) commonly found in speech about a particular domain to which the grammar model 376 relates, whereas lexical information 386 is personalized to the user identifier output by the user recognition component 295 for the natural language input. For example, a grammar model 376 associated with a shopping domain may include a database of words commonly used when people discuss shopping.

A downstream process called named entity resolution actually links a portion of text data (identified by a NER component 362) to a specific entity known to the NLP system 120. To perform named entity resolution, the NLU component 260 may use gazetteer information (384a-384n) stored in the entity library storage 382. The gazetteer information 384 may be used to match text data (identified by a NER component 362) with different entities, such as song titles, contact names, etc. Gazetteers may be linked to users (e.g., a particular gazetteer may be associated with a specific user's music collection), may be linked to certain domains (e.g., a shopping domain, a music domain, a video domain, a communications domain, etc.), or may be organized in another manner.

Each recognizer 363 may also include an intent classification (IC) component 364. An IC component 364 parses text data input thereto to determine an intent(s) of a domain that potentially corresponds to the natural language input represented in the text data. An intent corresponds to an action to be performed that is responsive to the natural language input represented by the text data. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 378 associated with the domain that is associated with the recognizer 363 implementing the IC component 364.

The intents identifiable by a specific IC component 364 may be linked to domain-specific grammar frameworks 376 with "slots" to be filled. Each slot of a grammar framework 376 corresponds to a portion of text data that a NER component 362 believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, a NER component 362 may parse text data to identify words as subject, object, verb, preposition, etc. based on grammar rules and/or models prior to recognizing named entities in the text data. An IC component 364 may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

A NER component 362 may perform semantic tagging, which is the labeling of a word or combination of words according to their type/semantic meaning. A NER component 362 may parse text data using heuristic grammar rules, or a model may be constructed using techniques such as hidden Markov models, maximum entropy models, log linear models, conditional random fields (CRF), and the like. For example, a NER component 362, corresponding to a music domain recognizer 363, may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the domain (in the knowledge base 372). For example, if the text data corresponds to "play songs by the rolling stones," after failing to determine an album name or song name called "songs" by "the rolling stones," the NER component 362 may search a music domain vocabulary for the word "songs." In the alternative, generic words may be checked before the gazetteer information, or both may be tried, potentially producing two different results.

The NLU component 260 may tag text data to attribute meaning thereto. For example, the NLU component 260 may tag "play mother's little helper by the rolling stones" as: {domain} Music, {intent} Play Music, {artist name} rolling stones, {media type} SONG, and {song title} mother's little helper. For further example, the NLU component 260 may tag "play songs by the rolling stones" as: {domain} Music, {intent} Play Music, {artist name} rolling stones, and {media type} SONG.

Figure 4:
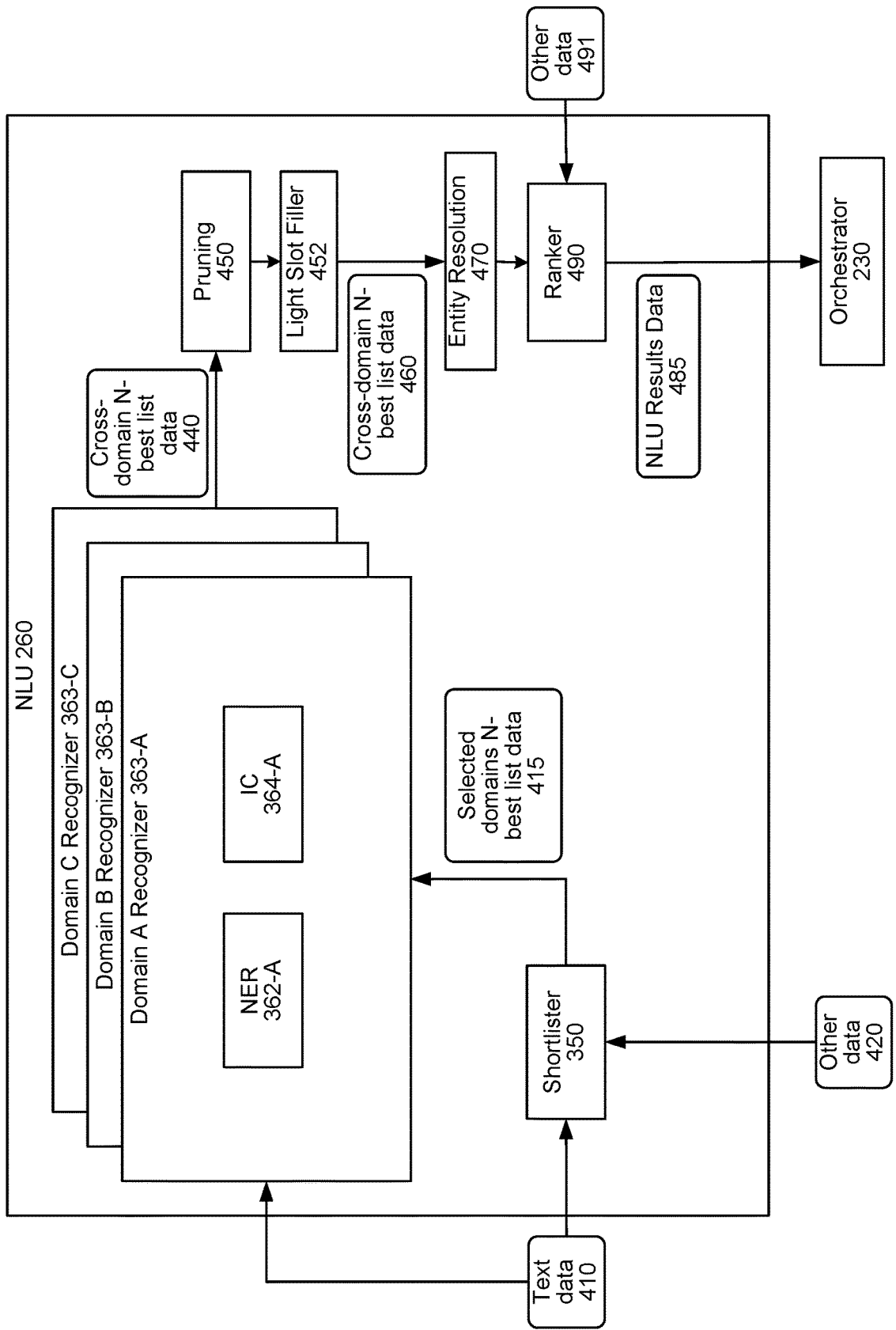
FIG. 4 is a conceptual diagram of how natural language processing is performed, in accordance with embodiments of the present disclosure.

The shortlister component 350 may receive text data 410 (output from the ASR component 250 or received from the device 110b) (as illustrated in FIG. 4). The ASR component 250 or orchestrator component 230 may embed the text data 410 into a form processable by a trained model(s) using sentence embedding techniques as known in the art. Sentence embedding results in the text data 410 including text in a structure that enables the trained model(s) of the shortlister component 350 to operate on the text data 410. For example, an embedding of the text data 410 may be a vector representation.

The shortlister component 350 may make binary determinations (e.g., yes or no) regarding which domain(s) relates to the text data 410. The shortlister component 350 may make such determinations using the one or more trained models described herein above. If the shortlister component 350 implements a single trained model for each domain, the shortlister component 350 may simply run the models that are associated with domains corresponding to enabled skill components 125 as indicated in a profile associated with the device 110 (that sent data representing the natural language input to the NLP system 120) and/or user identifier output by the user recognition component 295.

The shortlister component 350 may generate N-best list data 415 representing domains to which the natural language input may correspond. The size of the N-best list represented in the N-best list data 415 is configurable. In an example, the N-best list data 415 may indicate every domain of the NLP system 120, as well as contain an indication, for each domain, regarding whether the natural language input likely corresponds to the domain. In another example, instead of indicating every domain of the NLP system 120, the N-best list data 415 may only indicate domains likely corresponding to the natural language input. In yet another example, the shortlister component 350 may implement thresholding such that the N-best list data 415 may indicate no more than a maximum number of domains. In another example, only domains associated with confidence scores satisfying a threshold confidence score may be represented in the N-best list data 415.

The text data 410 may include more than one ASR hypothesis. When this occurs, the shortlister component 350 may output a different N-best list (represented in the N-best list data 415) for each ASR hypothesis. Alternatively, the shortlister component 350 may output a single N-best list representing the domains that likely correspond to one or more of the multiple ASR hypotheses.

As indicated above, the shortlister component 350 may implement thresholding such that a N-best list output therefrom may include no more than a threshold number of entries. If the text data 410 includes more than one ASR hypothesis, the N-best list output by the shortlister component 350 may include no more than a threshold number of entries irrespective of the number of ASR hypotheses output by the ASR component 250. Alternatively or additionally, the N-best list output by the shortlister component 350 may include no more than a threshold number of entries for each ASR hypothesis.

In addition to making a binary determination regarding whether a domain likely corresponds to the natural language input, the shortlister component 350 may generate confidence scores representing such likelihoods. If the shortlister component 350 implements a different trained model for each domain, the shortlister component 350 may generate a different confidence score for each individual domain-trained model that is run. If the shortlister component 350 runs the models of every domain, the shortlister component 350 may generate a different confidence score for each domain of the NLP system 120. If the shortlister component 350 runs the models of only domains corresponding to skill components 125 indicated as enabled in a profile associated with the device 110 (that sent data representing the natural language input to the NLP system 120) and/or user identifier output by the user recognition component 295, the shortlister component 350 may only generate a different confidence score for domains corresponding to the enabled skill components 125. If the shortlister component 350 implements a single trained model with domain-specific portions, the shortlister component 350 may generate a different confidence score for each domain who's specifically trained portion is run. The shortlister component 350 may perform matrix vector modification to obtain confidence scores for all domains with respect to which the shortlister component 350 processes.

Illustrative N-best list data 415, including confidence scores, that may be output by the shortlister component 350 may be represented as:
  Search domain, 0.67
  Recipe domain, 0.62
  Information domain, 0.57
  Music domain, 0.42

As indicated, the confidence scores output by the shortlister component 350 may be numerical. The confidence scores output by the shortlister component 350 may alternatively be binned values (e.g., high, medium, low).

The shortlister component 350 may consider other data 420 when determining confidence scores for domains. The other data 420 may be character embedded prior to being input to the shortlister component 350. The other data 420 may alternatively be embedded using other techniques known in the art prior to being input to the shortlister component 350.

The other data 420 may include usage history data associated with the device 110 (that sent data representing the natural language input to the NLP system 120) and/or user identifier output by the user recognition component 295. For example, a confidence score of a domain may be increased if natural language inputs captured by the device 110 and/or originated from the user 5 routinely correspond the domain. Conversely, a confidence score of a domain may be decreased if natural language inputs captured by the device 110 and/or originated from the user 5 rarely correspond to the domain.

The other data 420 may include data indicating the domains corresponding to skill components 125 that are enabled with respect to the device 110 (that sent data representing the natural language input to the NLP system 120) and/or user identifier output by the user recognition component 295. The shortlister component 350 may use such data to determine which domain-specific trained model to run. That is, the shortlister component 350 may determine to only run the trained models associated with domains corresponding to enabled skill components 125. The shortlister component 350 may alternatively use such data to alter confidence scores of domains.

As an example, considering two skill components 125, one enabled (corresponding to a first domain) and another unenabled (corresponding to a second domain), the shortlister component 350 may run a first model specific to the first domain as well as a second model specific to the second domain. Alternatively, the shortlister component 350 may run a model configured to determine a score for each of the first domain and the second domain. The shortlister component 350 may determine a confidence score of 0.60 for each of the first domain and the second domain in the first instance. The shortlister component 350 may then alter those confidence scores based on which domain is associated with an enabled skill component 125. For example, the shortlister component 350 may increase the confidence score associated with the first domain (corresponding to the enabled skill component) while leaving the confidence score associated with the second domain (corresponding to unenabled skill component) the same. Alternatively, the shortlister component 350 may leave the confidence score associated with the first domain (corresponding to the enabled skill component) the same while decreasing the confidence score associated with the second domain (corresponding to the unenabled skill component). Alternatively, the shortlister component 350 may increase the confidence score associated with the first domain (corresponding to the enabled skill component) as well as decrease the confidence score associated with the second domain (corresponding to the unenabled skill component).

When the shortlister component 350 receives the text data 410, the shorlister component 350 may determine whether profile data associated with the user 5 and/or device 110 includes an indication of enabled skill components 125.

The other data 420 may include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such other data to determine which domain-specific trained model(s) to run. For example, if the device 110 corresponds to a displayless type device, the shortlister component 350 may determine not to run trained models specific to domains corresponding to skill components that output video data. The shortlister component 350 may alternatively use such other data to alter confidence scores of domains. For example, if the device 110 corresponds to a displayless type device, the shortlister component 350 may decrease a confidence score for a domain corresponding to skill components that output video data and/or increase a confidence score for a domain corresponding to skill components that only output audio data.

The type of device information represented in the other data 420 may represent output capabilities of a device to be used to output content to the user, which may not be the device that sent data representing the natural language input to the NLP system 120. For example, a user may speak "play Game of Thrones" to a device not including a display. The NLP system 120 may determine a smart TV or other display device (associated with the same user profile as the device that sent the data representing the natural language input to the NLP system 120) for outputting Game of Thrones. Thus, the other data 420 may represent the smart TV or other display device, and not the displayless device.

The other data 420 may include data indicating the device 110's speed, location, and/or other mobility information. For example, the device 110 may correspond to a vehicle including a display. If the vehicle is moving, the shortlister component 350 may decrease the confidence score associated with a domain corresponding to skill components that generate video data as it may be undesirable to output video content to a user while the user is driving. A device 110 may output data to the NLP system 120 indicating when the device 110 is moving.

The other data 420 may include data indicating a currently invoked skill component 125. For example, a user may speak a first (e.g., a previous) natural language input resulting in a music skill component being invoked to output music. As the music is being output, the NLP system 120 may receive a second (e.g., a current) natural language input. The shortlister component 350 may use such data to alter confidence scores of domains. For example, the shortlister component 350 may run a first model specific to a first domain as well as a second model specific to a second domain. The shortlister component 350 may determine a confidence score of 0.60 for each of the domains in the first instance. The shortlister component 350 may then alter the original confidence scores based on the music skill component causing music to be output while the current command was received. Based on the music skill component being invoked, the shortlister component 350 may (i) increase the confidence score associated with a music domain while leaving the confidence scores associated with other domains the same, (ii) leave the confidence score associated with the music domain the same while decreasing the confidence scores associated with other domains, or (iii) increase the confidence score associated with the music domain as well as decrease the confidence scores associated with other domains.

The shortlister component 350 may send the N-best list data 415 to recognizers 363 associated with domains. Alternatively, the shortlister component 350 may send the N-best list data 415 or some other indicator of the selected subset of domains to another component (such as the orchestrator component 230), which may in turn send the N-best list data 415 to the recognizers 363 corresponding to the domains included in the N-best list data 415. If the shortlister component 450 generates a N-best list representing domains without any associated confidence scores, the shortlister component 450/orchestrator component 230 may send the N-best list data 415 to each recognizer 363 associated with a domain in the N-best list. If the shortlister component 350 generates a N-best list representing domains with associated confidence scores, the shortlister component 350/orchestrator component 230 may send the N-best list data 415 to recognizers 363 associated with domains associated with confidence scores satisfying (e.g., meeting or exceeding) a threshold minimum confidence score.

A recognizer 363 may output a NLU hypothesis (e.g., including tagged text data generated by a NER component 362 and an intent indicator determined by an IC component 364), as described herein above. The NLU component 260 may compile the output NLU hypotheses of the recognizers 363 into cross-domain N-best list data 440, and may send the cross-domain N-best list data 440 to a pruning component 450. Each NLU hypothesis represented in the cross-domain N-best list data 440 may be associated with a respective score indicating a likelihood that the NLU hypothesis corresponds to the domain associated with the recognizer 363 from which the NLU hypothesis was output. For example, the cross-domain N-best list data 440 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the tagged text represented in the cross-domain N-best list data 440 according to their respective scores. The pruning component 450 may then perform score thresholding with respect to the cross-domain N-best list data 440. For example, the pruning component 450 may select one or more NLU hypotheses, represented in the cross-domain N-best list data 440, associated with scores satisfying (e.g., meeting and/or exceeding) a threshold score. The pruning component 450 may additionally or alternatively perform number of NLU hypothesis thresholding. For example, the pruning component 450 may select the top-scoring NLU hypotheses. The pruning component 450 may generate cross-domain N-best list data 460 including the selected NLU hypotheses. The purpose of the pruning component 450 is to create a reduced list of NLU hypotheses so that downstream, more resource intensive, processes may only operate on the NLU hypotheses that most likely correspond to the natural language input.

The NLU component 260 may also include a light slot filler component 452. The light slot filler component 452 can take text from slots represented in the NLU hypotheses output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain N-best list data 460.

The NLU component 260 sends the cross-domain N-best list data 460 to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base that is used to specifically identify the precise entity referred to in each slot of each NLU hypothesis represented in the cross-domain N-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output N-best list data, altered from the cross-domain N-best list data 460, that includes more detailed information (e.g., entity IDs) about the specific entities mentioned in the slots and/or more detailed slot data that can eventually be used by a skill component 125 to perform an action responsive to the natural language input. The NLU component 260 may include multiple entity resolution components 470, with each entity resolution component being specific to one or more domains.

The entity resolution component 470 may not be successful in resolving every entity and filling every slot represented in the N-best list represented in the cross-domain N-best list data 460. This may result in the entity resolution component 470 outputting incomplete results. The NLU component 260 may include a ranker component 490. The ranker component 490 may assign a particular confidence score to each NLU hypothesis input therein. The confidence score of a particular NLU hypothesis may be affected by whether the NLU hypothesis has unfilled slots. For example, if a NLU hypothesis associated with a first domain includes slots that are all filled/resolved, the ranker component 490 may assign the NLU hypothesis a higher confidence score than another NLU hypothesis including at least some slots that are unfilled/unresolved by the entity resolution component 470.

The ranker component 490 may apply re-scoring, biasing, or other techniques. To do so, the ranker component 490 may consider not only the data output by the entity resolution component 470, but may also consider other data 491. The other data 491 may include a variety of information.

The other data 491 may include skill component 125 rating or popularity data. For example, if one skill component has a high rating, the ranker component 490 may increase the score of a NLU hypothesis associated with a domain corresponding to that skill component.

The other data 491 may include information about skill components 125 that have been enabled by the user that originated the natural language input. For example, the ranker component 490 may assign higher scores to NLU hypotheses associated with domains corresponding to enabled skill components 125 than NLU hypotheses associated with domains corresponding to skill components 125 that have not been enabled by the user.

The other data 491 may include data indicating system usage history (e.g., specific to the user), such as if the user that originated the natural language input regularly invokes a particular domain or does so at particular times of day. The other data 491 may include data indicating date, time, location, weather, type of device 110, user identifier, context, as well as other information. For example, the ranker component 490 may consider when any particular skill component 125 is currently active (e.g., music being output by the skill component 125, a game being executed by the skill component 125, etc.).

The ranker component 490 may output NLU results data 485. The NLU results data 485 may include multiple NLU hypotheses, or a single NLU hypothesis. The NLU results data 485 may be sent to the orchestrator component 230.

After receiving the NLU results data 485, the orchestrator component 230 may send the NLU results data 485 to an intent/skill component pair ranker 510. The intent/skill component pair ranker 510 may determine, for an intent represented in the NLU results data 485, one or more skill components 125 configured to execute with respect to the intent, resulting in the intent/skill component pair ranker 510 generating intent/skill component pairs.

The intent/skill component pair ranker 510 may include a statistical component that produces a ranked list of intent/skill component pairs with associated scores. Each score may indicate an adequacy of the skill component's proposed execution of the top-scoring NLU hypothesis represented in the NLU results data 485. The intent/skill component pair ranker 510 may operate one or more trained models configured to process the NLU results data 485, potential result data 515, and other data 525 in order to generate ranked intent/skill component pairs.

The intent/skill component pair ranker 510 may determine skill components 125 corresponding to the domain corresponding to the top-scoring NLU hypothesis in the NLU results data 485. The intent/skill component pair ranker 510 may thereafter determine a portion of the skill components 125 (corresponding to the domain) that are indicated as enabled in a profile associated with the device 110 (that sent data representing the natural language input to the NLP system 120) and/or user identifier output by the user recognition component 295.

The intent/skill component pair ranker 510 may query each skill component 125 (e.g., corresponding to the domain and enabled by the user) for potential result data 515 representing a potential result of a skill component's processing with respect to the top-scoring NLU hypothesis represented in the NLU results data 485. For example, the intent/skill component pair ranker 510 may send the top-scoring NLU hypothesis to a first skill component 125a along with an instruction for the first skill component 125a to indicate whether the first skill component 125a can execute with respect to the top-scoring NLU hypothesis, and optionally what action the first skill component 125a would perform in response to the top-scoring NLU hypothesis. The intent/skill component pair ranker 510 may also send the top-scoring NLU hypothesis to a second skill component 125b along with an instruction for the second skill component 125b to indicate whether the second skill component 125b can execute with respect to the top-scoring NLU hypothesis, and optionally what action the second skill component 125b would perform in response to the top-scoring NLU hypothesis. The intent/skill component pair ranker 510 may query skill components 125 in parallel, substantially in parallel, or in series.

In response, the intent/skill component pair ranker 510 may receive, from the first skill component 125a, first potential result data 515a representing whether the first skill component 125a can execute with respect to the top-scoring NLU hypothesis, and optionally what action the first skill component 125a would perform in response to the top-scoring NLU hypothesis. The intent/skill component pair ranker 510 may also receive, from the second skill component 125b, second potential result data 515b representing whether the second skill component 125b can execute with respect to the top-scoring NLU hypothesis, and optionally what action the second skill component 125b would perform in response to the top-scoring NLU hypothesis.

Potential result data 515 may include various components. For example, potential result data 515 may simply indicate whether or not a skill component 125 can execute with respect to the top-scoring NLU hypothesis.

Potential result data 515 may additionally or alternatively include outputtable data generated by a skill component 125 based on the top-scoring NLU hypothesis. In some situations, a skill component 125 may need further information, in addition to what is represented in the top-scoring NLU hypothesis, to provide outputtable data. In these situations, potential result data 515 may indicate slots of a framework that the skill component 125 further needs filled and/or entities that the skill component 125 further needs resolved prior to the skill component 125 being able to provided outputtable data responsive to the top-scoring NLU hypothesis.

Potential result data 515 may additionally or alternatively include an instruction indicating how the skill component 125 recommends the NLP system 120 query a user for further information needed by the skill component 125 to generate outputtable data. Potential result data 515 may additionally include an indication of whether the skill component 125 will have all needed information after the user provides additional information a single time, or whether the skill component 125 will need the user to provide various additional information prior to the skill component 125 having all needed information to generate outputtable data.

The following are non-limiting examples of configurations of potential result data 515:
  Skill component 1: indication representing the skill component can execute with respect to the top-scoring NLU hypothesis
  Skill component 2: indication representing the skill component needs an additional resolved entity to generate outputtable data
  Skill component 3: indication representing the skill component can provide numerous outputtable data in response to the top-scoring NLU hypothesis The intent/skill component pair ranker 510 may generate a score for each intent/skill component pair. A score may be generated based on the potential result data 515 provided by a skill component 125. For example, a score for an intent/first skill component pair may be generated based on first potential result data 515a provided by the first skill component 125a, whereas a score for an intent/second skill component pair may be generated based on second potential result data 515b provided by the second skill component 125b. The intent/skill component pair ranker 510 may generate numeric scores (e.g., from 0.0 to 1.0, or on some other scale) and/or binned scores (e.g., low, medium, high).

The intent/skill component pair ranker 510 may prefer skill components 125 that provide outputtable data over skill components 125 that indicate further information is needed and skill components 125 that indicate multiple outputtable data can be generated. For example, the intent/skill component pair ranker 510 may increase the score, associated with an intent/skill component pair, whose skill component 125 simply provided outputtable data. For further example, the intent/skill component pair ranker 510 may decrease the score, associated with an intent/skill component pair, whose skill component 125 indicated further information is needed. In another example, the intent/skill component pair ranker 510 may decrease the score, associated with an intent/skill component pair, whose skill component 125 indicated multiple outputtable data could be generated.

The intent/skill component pair ranker 510 may additionally or alternatively generate a score based on other data 525. The other data 525 may include ratings associated with skill components 125. A rating may be a NLP system 120 rating or a user-specific rating. A rating may indicate a veracity of a skill component 125 from the perspective of one or more users of the NLP system 120. For example, the intent/skill component pair ranker 510 may increase a score, associated with an intent/skill component pair, if the skill component, of the pair, is associated with a rating satisfying (e.g., meeting or exceeding) a threshold rating. For further example, the intent/skill component pair ranker 510 may decrease a score, associated with an intent/skill component pair, if the skill component, of the pair, is associated with a rating failing to satisfy the threshold rating.

The other data 525 may indicate skill components 125 enabled by the user that originated the natural language input (e.g., indicated as enabled in a user profile associated with a top-scoring user identifier output by the user recognition component 295 with respect to the natural language input). For example, the intent/skill component pair ranker 510 may increase a score, associated with an intent/skill component pair, if the skill component, of the pair, is represented as enabled in a user profile corresponding to the user that originated the natural language input. For further example, the intent/skill component pair ranker 510 may decrease a score, associated with an intent/skill component pair, if the skill component, of the pair, is not represented as enabled (e.g., is not represented) in the user profile of the user that originated the natural language input.

The other data 525 may indicate output capabilities of a device 110 that will be used to output data, responsive to the natural language input, to the user. The system 100 may be configured with devices that include speakers but not displays, devices that include displays but not speakers, and devices that include speakers and displays. If the device 110, that will output data responsive to the natural language input, includes one or more speakers but not a display, the intent/skill component pair ranker 510 may increase the score associated with an intent/skill component pair whose skill component is configured to output audible data (e.g., audio data and/or text data that may undergo TTS processing), and/or decrease the score associated with an intent/skill component pair whose skill component is configured to output visual data (e.g., image data and/or video data). If the device 110, that will output data responsive to the natural language input, includes a display but not one or more speakers, the intent/skill component pair ranker 510 may increase the score associated with an intent/skill component pair whose skill component is configured to output visual data, and/or decrease the score associated with an intent/skill component pair whose skill component is configured to output audible data.

The other data 525 may indicate the type of device 110 that captured the natural language input. For example, the device 110 may correspond to a "hotel room" type if the device 110 is located in a hotel room. If a user inputs a natural language input corresponding to "order me food" to a hotel room device, the intent/skill component pair ranker 510 may increase the score associated with an intent/skill component pair corresponding to a room service skill component associated with the hotel, and/or decrease the score associated with an intent/skill component pair corresponding to a food skill component not associated with the hotel.

The other data 525 may indicate a location of the device 110 and/or a geographic location represented in a user profile corresponding to the top-scoring user identifier output by the user recognition component 295 for the natural language input. A skill component 125 may be configured to only operate with respect to certain geographic locations. For example, a natural language input may correspond to "when is the next train to Portland." A first skill component 125a may operate with respect to trains that arrive at, depart from, and pass through Portland, Oreg. A second skill component 125b may operate with respect to trains that arrive at, depart from, and pass through Portland, Me. If the device 110 is located at, and/or the user profile represents a geographic location of, Seattle, Wash., the intent/skill component pair ranker 510 may increase the score associated with an intent/skill component pair corresponding to the first skill component 125a and/or decrease the score associated with an intent/skill component pair corresponding to the second skill component 125b. Likewise, if the device 110 is located at, and/or the user profile represents a geographic location of, Boston, Mass., the intent/skill component pair ranker 510 may increase the score associated with an intent/skill component pair corresponding to the second skill component 125b and/or decrease the score associated with an intent/skill component pair corresponding to the first skill component 125a.

The other data 525 may indicate a time of day. A skill component 125 may be configured to operate with respect to certain times of day. For example, a natural language input may correspond to "order me food." A first skill component 125a may operate with respect to times of day corresponding to breakfast, whereas a second skill component 125b may operate with respect to times of day corresponding to the afternoon or evening. If the natural language input was received in the morning, the intent/skill component pair ranker 510 may increase the score associated with an intent/skill component pair corresponding to the first skill component 125a and/or decrease the score associated with an intent/skill component pair corresponding to the second skill component 125b. Likewise, if the natural language input was received in the afternoon or evening, the intent/skill component pair ranker 510 may increase the score associated with an intent/skill component pair corresponding to the second skill component 125b and/or decrease the score associated with an intent/skill component pair corresponding to the first skill component 125a.

The other data 525 may include user preferences represented in a user profile corresponding to the top-scoring user identifier output by the user recognition component 295 for the natural language input. In at least some examples, multiple skill components 125 may be configured to execute in substantially the same manner. For example, a first skill component 125a and a second skill component 125b may both be configured to order food from respective restaurants. The NLP system 120 may store a user preference (e.g., in a user profile corresponding to the top-scoring user identifier output by the user recognition component 295 for the natural language input) indicating the user prefers the first skill component 125a over the second skill component 125b. As a result, the intent/skill component pair ranker 510 may increase the score associated with an intent/skill component pair corresponding to the first skill component 125a and/or decrease the score associated with an intent/skill component pair corresponding to the second skill component 125b.

The other data 525 may include a system usage history associated with the top-scoring user identifier output by the user recognition component 295 for the natural language input. For example, the system usage history may indicate the user has input natural language inputs that invoke a first skill component 125a more often than the user inputs natural language inputs that invoke a second skill component 125b. Based on this, if the present natural language input may be executed by both the first skill component 125a and the second skill component 125b, the intent/skill component pair ranker 510 may increase the score associated with an intent/skill component pair corresponding to the first skill component 125a and/or decrease the score associated with an intent/skill component pair corresponding to the second skill component 125b.

The other data 525 may indicate a speed at which the device 110, that received the natural language input, is traveling. For example, the device 110 may be located in a moving vehicle, or may be a moving vehicle itself. When a device 110 is in motion, the intent/skill component pair ranker 510 may be configured to prefer audible outputs rather than visual outputs to decrease the likelihood of distracting a driver of a vehicle. Thus, for example, if the device 110 is moving at or above a threshold speed (e.g., a speed above an average user's walking or running speed), the intent/skill component pair ranker 510 may increase the score associated with an intent/skill component pair corresponding to a first skill component 125a that generates audio data or text data that can be converted into audio data using TTS processing. The intent/skill component pair ranker 510 may additionally or alternatively decrease the score associated with an intent/skill component pair corresponding to a second skill component 125b that generates image data or video data.

The other data 525 may indicate a length of time between when a skill component 125 received a query from the intent/skill component pair ranker 510 and when the skill component 125 provided potential result data 515 in response thereto. When the intent/skill component pair ranker 510 queries multiple skill components 125, the skill components 125 may respond at different speeds. The intent/skill component pair ranker 510 may implement a latency budget. For example, if the intent/skill component pair ranker 510 determines a skill component 125 responds to a query of the intent/skill component pair ranker 510 within a threshold length of time from receiving the query, the intent/skill component pair ranker 510 may increase the score associated with an intent/skill component pair corresponding to that skill component 125. Conversely, if the intent/skill component pair ranker 510 determines a skill component 125 does not respond to a query of the intent/skill component pair ranker 510 within a threshold length of time from receiving the query, the intent/skill component pair ranker 510 may decrease the score associated with an intent/skill component pair corresponding to that skill component 125.

One skilled in the art will appreciate that the foregoing other data 525 is illustrative, and that other or additional other data 525 may be considered by the intent/skill component pair ranker 510 when determining scores for intent/skill component pairs. Moreover, while foregoing examples describe determining scores for first and second skill components (125a/125b), one skilled in the art will appreciate that the intent/skill component pair ranker 510 may determine scores for more than two skill components.

The intent/skill component pair ranker 510 may implement one or more trained models for determining scores based on potential result data 515 and other data 525. The model(s) of the intent/skill component pair ranker 510 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the intent/skill component pair ranker 510, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The intent/skill component pair ranker 510 may send the ranked intent/skill component pairs 535 to the orchestrator component 230. Referring back to FIG. 2, the orchestrator component 230 may send the top-scoring NLU hypothesis, of the NLU results data 485, to the skill component 125 corresponding to the top-scoring intent/skill component pair in the ranked intent/skill component pair 535.

A skill component 125 may be configured to execute with respect to NLU results data. For example, a weather skill component may determine weather information for a geographic location represented in a user profile or corresponding to a location of the device 110 that captured the natural language input. For further example, a taxi skill component may book a requested ride. In another example, a restaurant skill component may place an order for a pizza. A skill component 125 may operate in conjunction between the NLP system 120 and other devices, such as the device 110, in order to complete certain functions. Inputs to a skill component 125 may come from speech processing interactions or through other interactions or input sources.

A skill component 125 may be associated with a domain. A non-limiting list of illustrative domains includes a smart home domain, a music domain, a video domain, a flash briefing domain, a shopping domain, and/or a custom domain.

As used herein, a "skill component" may refer to software that may be placed on a machine or a virtual machine (e.g., software that may be launched in a virtual instance when called. In at least some examples, a skill component may be software customized to perform one or more actions as indicated by a business entity, device manufacturer, user, etc.

The NLP system 120 may include a TTS component 280. The TTS component 280 may generate audio data (e.g., synthesized speech) from text data using one or more different methods. Text data input to the TTS component 280 may come from a skill component 125, the orchestrator component 230, or another component of the NLP system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The NLP system 120 may include profile storage 270. The profile storage 270 may include a variety of information related to individual users, groups of users, devices, etc. that interact with the NLP system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill components 125 that the user has enabled. When a user enables a skill component 125, the user is providing the NLP system 120 with permission to allow the skill component 125 to execute with respect to the user's natural language inputs. If a user does not enable a skill component 125, the NLP system 120 may not invoke the skill component 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Figure 6:
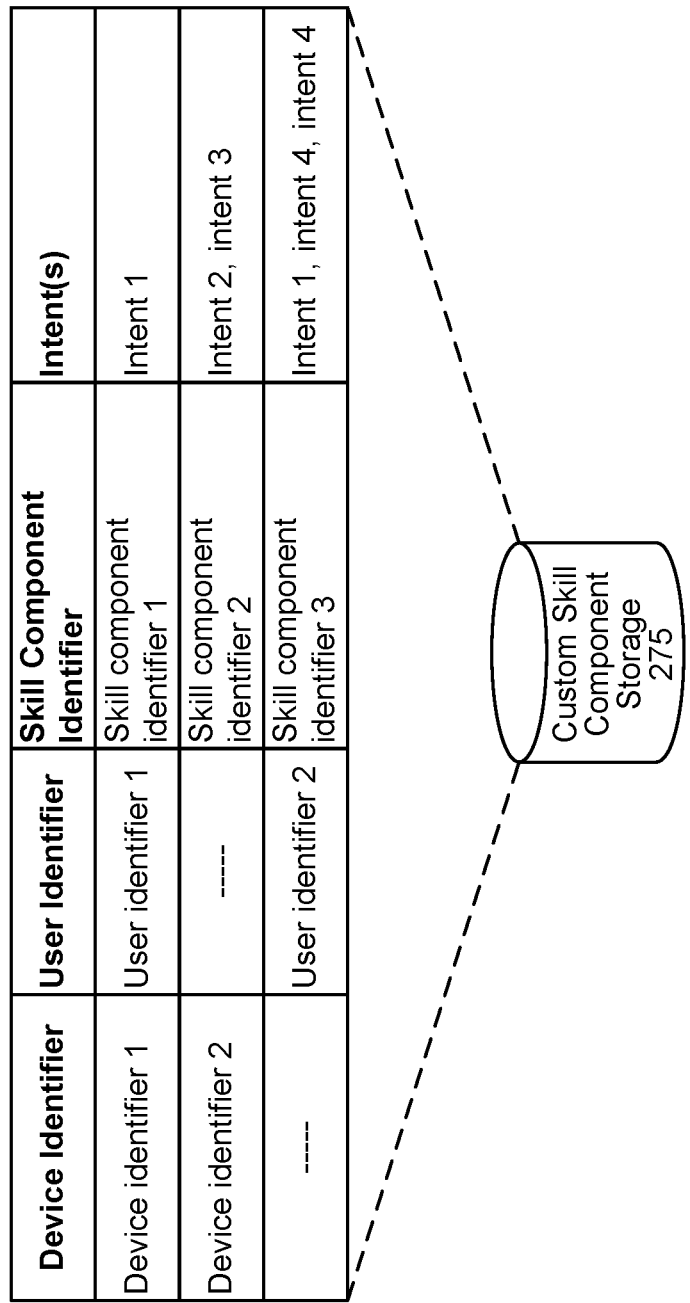
FIG. 6 is a conceptual diagram illustrating data that may be stored in a custom skill component storage, in accordance with embodiments of the present disclosure.

The NLP system 120 may include a custom skill component storage 275. As represented in FIG. 6, a device identifier and/or a user identifier may be associated with a skill component identifier corresponding to a skill component associated with a particular fleet of devices (e.g., devices placed in the rooms of a hotel), associated with a user-customized skill, etc. A skill component identifier may be associated with one or more intents corresponding to one or more requested actions that may be performed by the skill component corresponding to the skill component identifier.

Figure 7:
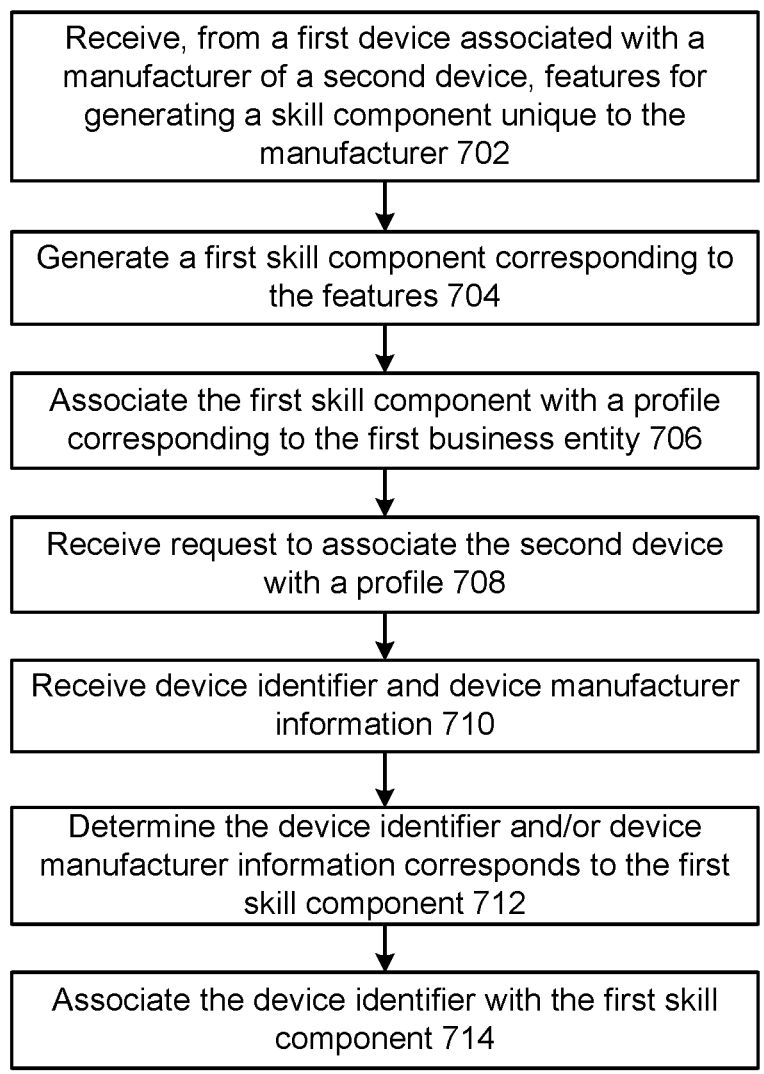
FIG. 7 is a process flow diagram illustrating an example of how a manufacturer-specific skill component may be generated and associated with a device produced by the manufacturer, in accordance with embodiments of the present disclosure.

In at least some examples, the NLP system 120 may generate a skill, implementable by a skill component 125, for a device manufacturer whose device 110 is configured to communicate with the NLP system 120. Examples of such devices that may be generated by a manufacturer (different from an operator of the NLP system 120) include, for example, global positioning system (GPS) devices, smart home devices, smart thermometers, smart door bells, smart appliances (e.g., refrigerators, ovens, microwaves, toasters, etc.), vehicle head units, etc. As illustrated in FIG. 7, the NLP system 120 may receive (702), from a device manufacturer, features for generating a skill component 125 unique to the manufacturer. Such features may include, for example, sample natural language inputs for invoking the to be generated skill component, one or more actions to be supported by the to be generated skill component, a wakeword to be used to wake a device 110 for purposes of providing natural language inputs to be processed by the to be generated skill component, etc.

The NLP system 120 may thereafter generate (704) a first skill component 125*a* based on the features (e.g., a first skill component 125*a* configured to perform the one or more actions). The NLP system 120 may also associate the first skill component 125*a* with a first skill component identifier. The NLP system 120 may associate the first skill component 125*a* with the device manufacturer by, for example, associating (706) the first skill component identifier with a profile (stored in the profile storage 270) corresponding to the device manufacturer. Such association may also include associating the first skill component identifier with a wakeword to be used to wake a device 110 for purposes of providing natural language inputs to be processed by the first skill component 125*a*.

The NLP system 120 may thereafter receive (708) a request to associate a device 110 with a profile (e.g., a user profile or a group profile) stored in the profile storage 270. For example, the NLP system 120 may receive such a request when the user 5 has newly obtained the second device and desires to associate the second device with the user 5's profile so the user 5 may interact with the NLP system 120 via the device 110.

During processing to associate the device 110 with the profile, the NLP system 120 may receive (710) a device identifier of the device 110, and manufacturer information for the device 110 (such as a name of the manufacturer). In at least some examples, the NLP system 120 may receive the device identifier and/or manufacturer information as user inputs through an application, associated with the NLP system 120, that is installed on a smart phone, tablet, or other like device of the user 5. In at least some other examples, the NLP system 120 may receive the device identifier and/or manufacturer information from the device 110 via automated pairing processing whereby pairing of the device 110 with the profile includes direct (e.g., not via a smart phone, tablet, or other like device of the user 5) communications between the device 110 and the NLP system 120.

The NLP system 120 may determine (712) the device identifier and/or manufacturer information corresponds to the first skill component 125*a*, generated using features provided by the device manufacturer. For example, the device manufacturer may provide the NLP system 120 with serial numbers (a form of device identifier) for devices made by the manufacturer and which may communicate with the NLP system 120. In such examples, if the NLP system 120 receives the device 110's serial number from the user 5 or during an automated pairing process, the NLP system 120 may determine the received serial number is represented in a list of serial numbers previously provided by the manufacturer. The NLP system 120 may thereafter determine that the manufacturer is associated with the first skill component 125*a* and by extension, based on the device 110 being associated with the manufacturer, determine the device 110 is to be associated with the first skill component 125*a*.

The NLP system 120 may thereafter associate (714) device identifier (e.g., the device serial number or some other device identifier, such as one generated by the NLP system 120 to be unique to the device 110) with the first skill component 125*a*. For example, the NLP system 120 may associate the device identifier with a skill component identifier (corresponding to the first skill component 125*a*).

As described above, a device manufacturer may provide the NLP system 120 with one or more actions to be supported by the first skill component 125*a*. One skilled in the art will appreciate that an action, which is the result of a skill component's processing, may correspond to an intent understandable by the NLU component 260; but that an action may not, itself, be an intent. Thus, it will be appreciated that a device manufacturer may provide the NLP system 120 with one or more results to be generated by the first skill component 125*a*, but not one or more corresponding intents. The NLP system 120 may include intelligence for determining an intent corresponding to a device manufacturer-provided action. The NLP system 120 may associate the determined intent with the associated device identifier and skill component identifier.

By associating the device 110 with the first skill component 125*a* and one or more particular intents, natural language inputs corresponding to the one or more particular intents may be favored to be handled by the first skill component 125a, but natural language inputs not corresponding to the one or more particular intents may not be favored to be handled by the first skill component 125a. Such enables a device manufacturer to tailor the user experience with respect to only a subset of intents capable of being recognized and handled by the NLP system 120. In other words, a device manufacturer's device 110 may be configured to capture a natural language input generally, without regard to which intent the natural language input corresponds. The device 110 may send the natural language input to the NLP system 120, where NLU processing (or SLU processing) is performed to determine an intent representing the natural language input. If the NLP system 120 determines the intent corresponds to an intent corresponding to the device manufacturer's skill component, the device manufacturer's skill component may be invoked to process with respect to the natural language input. However, if the NLP system 120 determines the intent does not correspond to an intent corresponding to the device manufacturer's skill component, the NLP system 120 may perform processing to determine the best skill component 125 (which may not be the device manufacturer's skill component) to invoke to process with respect to the natural language input.

In at least some examples, a first business entity (e.g., associated with a hotel, a hospital, etc.) may purchase devices produced by a second business entity that controls the NLP system 120. For example, the first business entity may purchase devices that are produced by the second business entity and that communicate with the NLP system 120 for the purpose of responding to natural language inputs, and other inputs. For example, a hotel may purchase devices for placement in guest rooms, a hospital may purchase devices for placement in patient rooms, a business may purchase devices for placement in conference rooms, etc.

The first business entity may desire to tailor the user experience for customers of the first business with respect to certain natural language inputs. For example, a hotel may desire that the natural language input "order me towels" result in more towels being delivered to the user's room, rather than towels being ordered for the user through an online ordering system. For further example, a hospital may desire that the natural language input "order me food" result in food being ordered through a cafeteria associated with the hospital (which may ensure dietary restrictions are conformed to for a patient associated with the room of the hospital in which the device is located), rather than food being ordered through a restaurant unassociated with the hospital. In another example, a business may desire that the natural language input "order notepads" result in an office services devices receiving a notification to place more notepads in a conference room in which the device is located, rather than notepads being ordered through an online ordering system with office services oversight.

Figure 8:
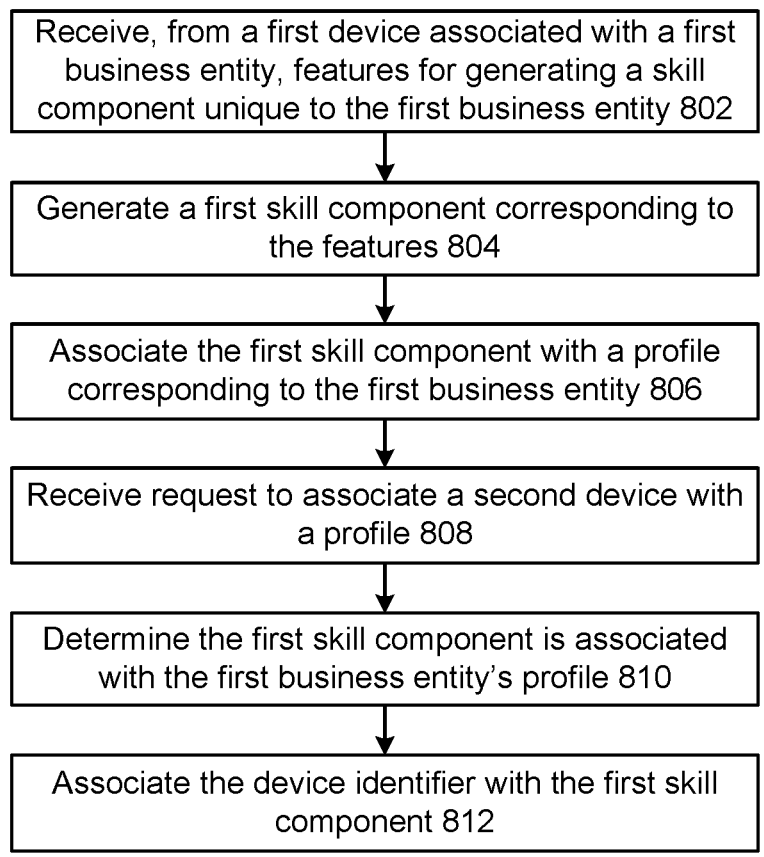
FIG. 8 is a process flow diagram illustrating an example of how a first business entity-specific skill component may be generated and associated with a device produced by a second business entity that controls a natural language processing (NLP) system, in accordance with embodiments of the present disclosure.

Referring to FIG. 8, the NLP system 120 may receive (802), from a first business entity device, features for generating a skill component 125 unique to the first business entity. Such features may include, for example, sample natural language inputs for invoking the to be generated skill component, one or more actions to be supported by the to be generated skill component, a wakeword to be used to wake a device 110 for purposes of providing natural language inputs to be processed by the to be generated skill component, etc.

The NLP system 120 may thereafter generate (804) a first skill component 125a based on the features (e.g., a first skill component 125a configured to perform the one or more actions). The NLP system 120 may also associate the first skill component 125a with a first skill component identifier. The NLP system 120 may associate the first skill component 125a with the first business entity by, for example, associating (806) the first skill component identifier with a profile (stored in the profile storage 270) corresponding to the first business entity. Such association may also include associating the first skill component identifier with a wakeword to be used to wake a device 110 for purposes of providing natural language inputs to be processed by the first skill component 125a.

The NLP system 120 may thereafter receive (808) a request to associate a device 110 (associated with a device identifier) with a profile stored in the profile storage 270. For example, the NLP system 120 may receive a request to associate the device 110 with a profile corresponding to the first business entity (e.g., a hotel, a hospital, or some other business entity that may purchase various devices 110 and desire that user experiences by uniform across the purchased devices 110 for at least certain natural language inputs).

The NLP system 120 may determine (810) the first skill component 125a is associated with the first business entity's profile (e.g., by virtue of the first skill identifier being associated with the first business entity's profile), and thereafter associate (812) the device 110 with the first skill component 125a. For example, the NLP system 120 may associate the device identifier (associated with the device 110) with a skill component identifier (corresponding to the first skill component 125a).

The NLP system 120 may determine GPS coordinates of the device 110. For example, the NLP system 120 may identify the device 110's GPS coordinates in a profile corresponding to the device 110. For further example, the NLP system 120 may receive the device 110's GPS coordinates from the first device associated with the business entity (e.g., an employee of the business entity may input the GPS coordinates or information to identify GPS coordinates, such as the business entity's address, to the first device, which may send the GPS coordinates or other information to the NLP system 120). Thereafter, the NLP system 120 may associate the GPS coordinates with the first skill component identifier.

As described above, a business entity may provide the NLP system 120 with one or more actions to be supported by the first skill component 125a. As described above, an action, which is the result of a skill component's processing, may correspond to an intent understandable by the NLU component 260; but an action may not, itself, be an intent. Thus, it will be appreciated that a business entity may provide the NLP system 120 with one or more results to be generated by the first skill component 125a, but not one or more corresponding intents. The NLP system 120 may include intelligence for determining an intent corresponding to a business entity-provided action. The NLP system 120 may associate the determined intent with the associated device identifier and skill component identifier.

By associating the device 110 with the first skill component 125a and one or more particular intents, natural language inputs corresponding to the one or more particular intents may be favored to be handled by the first skill component 125a, but natural language inputs not corresponding to the one or more particular intents may not be favored to be handled by the first skill component 125a. Such enables a business entity to tailor the user experience with respect to only a subset of intents capable of being recognized and handled by the NLP system 120. In other words, a device 110 (e.g., purchased by a first business entity and which is produced by a second business entity that controls the NLP system 120) may be configured to capture a natural language input generally, without regard to which intent the natural language input corresponds. The device 110 may send the natural language input to the NLP system 120, where NLU processing (or SLU processing) is performed to determine an intent representing the natural language input. If the NLP system 120 determines the intent corresponds to an intent corresponding to the first business entity's skill component, the first business entity's skill component may be invoked to process with respect to the natural language input. However, if the NLP system 120 determines the intent does not correspond to an intent corresponding to the first business entity's skill component, the NLP system 120 may perform processing to determine the best skill component 125 (which may not be the first business entity's skill component) to invoke to process with respect to the natural language input.

In at least some examples, the user 5 may desire to have a user experience tailored for certain natural language inputs. For example, the user 5 may desire a natural language input be responded to in a manner that is different from how the natural language input would be responded to using one or more pre-established skill components 125.

Figure 9:
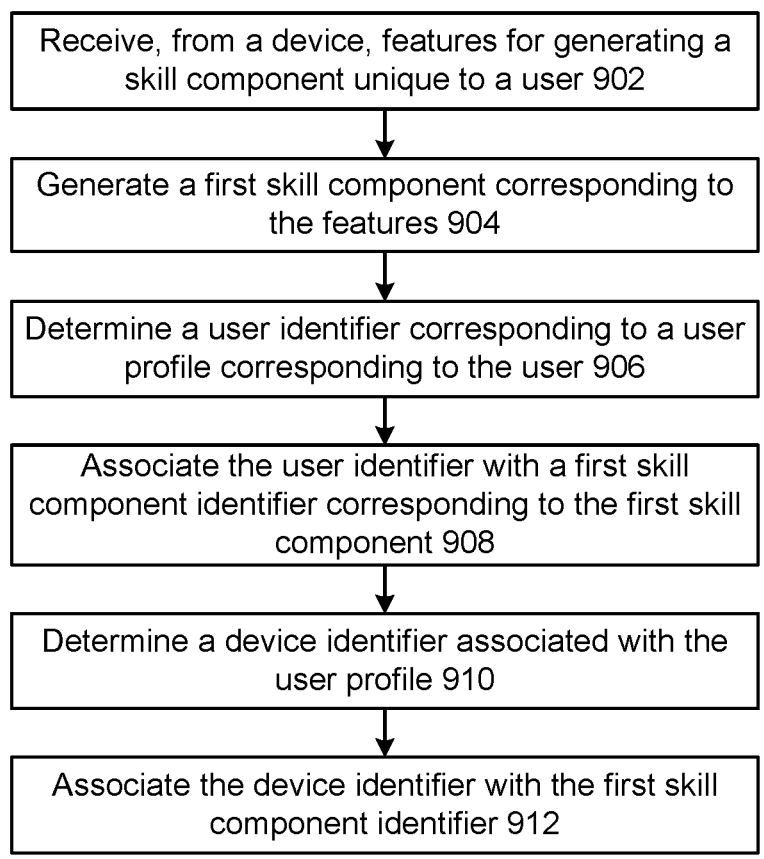
FIG. 9 is a process flow diagram illustrating an example of how a user-specific skill component may be generated and associated with a user, in accordance with embodiments of the present disclosure.

Referring to FIG. 9, the NLP system 120 may receive (902), from a device 110 (such as a smart phone, tablet, or the like computing device), features for generating a skill component 125 unique to the user 5. Such features may include, for example, sample natural language inputs for invoking the to be generated skill component, one or more actions to be supported by the to be generated skill component, etc.

The NLP system 120 may thereafter generate (904) a first skill component 125a based on the features (e.g., a first skill component 125a configured to perform the one or more actions). The NLP system 120 may also associate the first skill component 125a with a first skill component identifier.

The NLP system 120 may determine (906) a user identifier corresponding to a user profile corresponding to the user 5.

The NLP system 120 may associate the first skill component 125a with the user 5 by, for example, associating (806) the first skill component identifier with a profile (stored in the profile storage 270) corresponding to the user 5.

The NLP system 120 may associate (908) (for example in the custom skill component storage 275) the user identifier and the first skill component identifier (thereby associating the first skill component 125a with the user 5).

As described above, a user 5 may provide the NLP system 120 with one or more actions to be supported by the first skill component 125a. As described above, an action, which is the result of a skill component's processing, may correspond to an intent understandable by the NLU component 260; but an action may not, itself, be an intent. Thus, it will be appreciated that a user 5 may provide the NLP system 120 with one or more results to be generated by the first skill component 125a, but not one or more corresponding intents. The NLP system 120 may include intelligence for determining an intent corresponding to a user-provided action. The NLP system 120 may associate the determined intent with the associated user identifier and first skill component identifier. The foregoing associations may configure the NLP system 120 to invoke the first skill component 125a to respond to natural language inputs input to the NLP system 120 by the user 5.

The NLP system 120 may determine (910) a device identifier associated with the user 5's profile. Such a device identifier may correspond to a device 110 registered to the user 5. The NLP system 120 may associate (912) the device identifier with the first skill component identifier, and optionally the one or more intents (for example in the custom skill component storage 275). The foregoing associations may configure the NLP system 120 to invoke the first skill component 125a to respond to natural language inputs sent to the NLP system 120 from the device 110 (corresponding to the device identifier) in situations when the user 5 is recognized, and also in situations when the user 5 is not recognized, but the user recognition component 295.

Figure 10A:
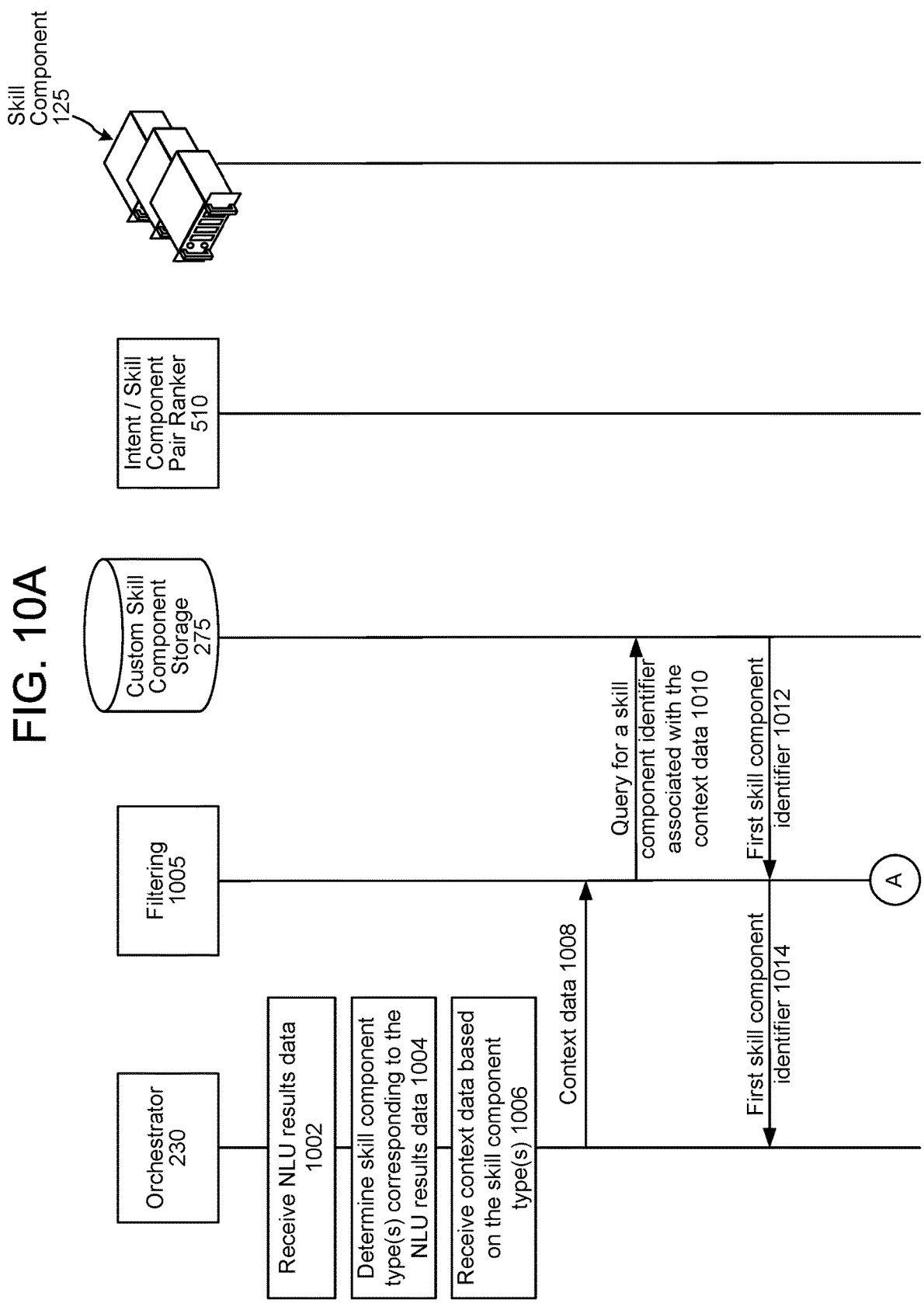

In at least some examples, the custom skill component storage 275 may include context data associated with a skill component identifier, but not any intents. FIGS. 10A through 10C illustrate processing that may be performed in such examples after NLU processing has been performed.

The orchestrator component 230 may receive (1002) NLU results data, representing a natural language input, from the NLU component 260. The orchestrator component 230 may also determine (1004) one or more skill component types corresponding to the NLU results data (e.g., one or more skill component types corresponding to enabled skills as represented in a profile (user profile, group profile, etc.) corresponding to the natural language input). The orchestrator component 230 may thereafter receive (1006) context data based on the determined skill component type(s). The orchestrator component 230 may send (1008) the context data to a filtering component 1005 of the NLP system 120.

The filtering component 1005 may query (1010) the custom skill component storage 275 for a skill component identifier associated with the context data. In response, the filtering component 1005 may receive (1012) a first skill component identifier associated with the context data in the custom skill component storage 275. The filtering component 1005 may send (1014) the first skill component identifier to the orchestrator component 230.

The orchestrator component 230 may send (1016) the first skill component identifier to the intent/skill component pair ranker 510. The orchestrator component 230 may also send (1018) the NLU results data to the intent/skill component pair ranker 510.

Figure 5:
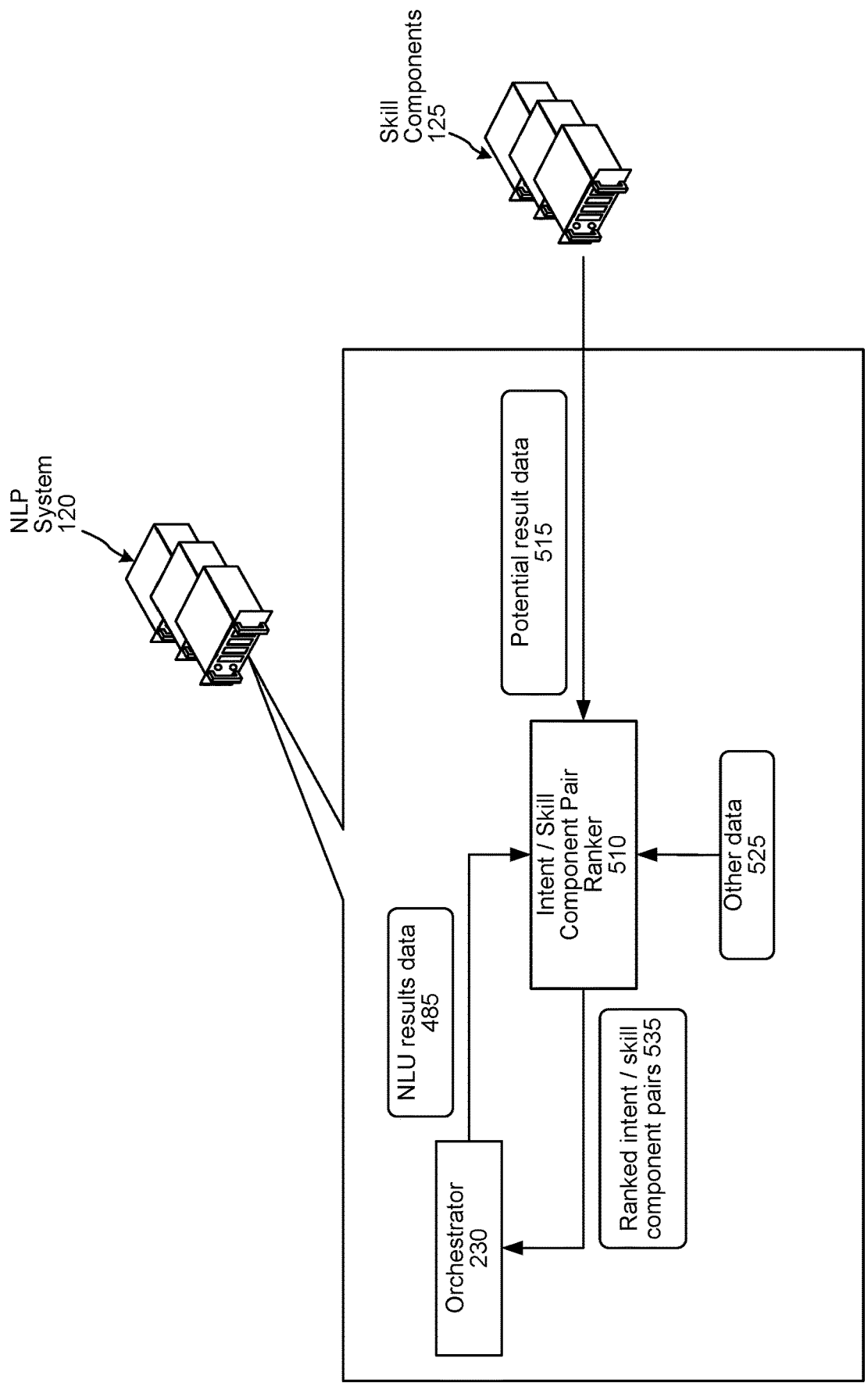
FIG. 5 is a conceptual diagram illustrating example processing of an intent/skill component pair ranker, in accordance with embodiments of the present disclosure.

The intent/skill component pair ranker 510 may perform processing, as described above with respect to FIG. 5, to determine (1020) ranked intent/skill component pairs based on the received first skill component identifier and the NLU results data. That is, the intent/skill component pair ranker 510 may rank the first skill component, corresponding to the received first skill component identifier, along with other skill components according to the teachings of FIG. 5. The intent/skill component pair ranker 510 may send (1022) the ranked intent/skill component pairs to the orchestrator component 230.

In at least some examples, the filtering component 1005 may receive "no results" data from the custom skill component storage 275 in response to querying the custom skill component storage 275 for a skill component identifier associated with the context data. The no results data, in this example, represents there is no skill component identifier associated with the context data in the custom skill component storage 275. In such examples, the filtering component 1005 may send, to the orchestrator component 230, data representing there is no skill component identifier associated with the context data in the custom skill component storage 275. In response to receiving such data, the orchestrator component 230 may send the NLU results data to the intent/skill component pair ranker 510, which may process with respect to the NLU results data to generate the ranked intent/skill component pairs, which the intent/skill component pair ranker 510 may send to the orchestrator component 230.

The orchestrator component 230 may determine (1024) the top-ranked skill component 125 in received ranked intent/skill component pairs. The orchestrator component 230 may send (1026), to the top-ranked skill component 125, the NLU results data (and more particularly a top-scoring NLU hypothesis output by the NLU component 260).

The skill component 125 may perform (1028) processing to perform an action responsive to the NLU results data (and more particularly responsive to the top-scoring NLU hypothesis). For example, for NLU results data corresponding to the natural language input "order me towels," the skill component 125 (e.g., of a hotel) may send an alert, to a room service device, including the room number (of the room within which the device 110 that captured the natural language input is located) and an indication that more towels were requested. For further example, for NLU results data corresponding to the natural language input "what is the weather," the skill component 125 may generate text data, representing a response to the natural language input, to be output to the user 5 as text or as TTS-generated synthesized speech (e.g., audio data).

In at least some examples, the filtering component 1005 may receive more than one skill component identifier in response to querying the custom skill component storage 275 for a skill component identifier(s) associated with the context data. In such examples, the filtering component 1005 may send the more than one received skill component identifiers to the intent/skill component pair ranker 510, which may process with respect to the received skill component identifier (and optionally other skill component identifiers).

In at least some examples, the custom skill component storage 275 may include context data associated with a skill component identifier and at least one intent. FIG. 11 illustrates processing that may be performed in such examples after NLU processing has been performed.

The orchestrator component 230 may receive (1002) NLU results data, representing a natural language input, from the NLU component 260. The orchestrator component 230 may also determine (1004) one or more skill component types corresponding to the NLU results data (e.g., one or more skill component types corresponding to enabled skills as represented in a profile (user profile, group profile, etc.) corresponding to the natural language input). The orchestrator component 230 may thereafter receive (1006) context data based on the determined skill component type(s). The orchestrator component 230 may send (1008) the context data to the filtering component 1005. The orchestrator component 230 may also send (1102), to the filtering component 1005, an intent indicator representing an intent of the top-scoring NLU hypothesis in the NLU results data.

The filtering component 1005 may query (1104) the custom skill component storage 275 for a skill component identifier associated with the context data and the intent indicator. Processing and signaling may thereafter be performed in accordance with steps 1012 through 1028 as described above.

In situations where the custom skill component storage 275 sends, to the filtering component 1005, a first skill component identifier and the first skill component identifier is sent to the intent/skill component pair ranker 510, data (representing the first skill component identifier was received from the custom skill component storage 275) may also be sent to the intent/skill component pair ranker 510. In at least some examples, in response to receiving the foregoing latter data, the intent/skill component pair ranker 510 may heavily weight a score associated with the first skill component identifier such that the first skill component identifier will be favored to be the top-ranked skill component identifier (output by the intent/skill component pair ranker 510) absent other data 525, and/or potential result data 515 received from another skill component, being substantially in favor of the other skill component such that the heavy weighting for the first skill component is overcome.

In at least some examples, the custom skill component storage 275 may include context data associated with a skill component identifier and at least one intent. FIGS. 12A and 12B illustrate processing that may be performed in such examples after NLU processing has been performed.

The orchestrator component 230 may receive (1002) NLU results data, representing a natural language input, from the NLU component 260. The orchestrator component 230 may also determine (1004) one or more skill component types corresponding to the NLU results data (e.g., one or more skill component types corresponding to enabled skills as represented in a profile (user profile, group profile, etc.) corresponding to the natural language input). The orchestrator component 230 may thereafter receive (1006) context data based on the determined skill component type(s). The orchestrator component 230 may send (1008) the context data to the filtering component 1005. The orchestrator component 230 may also send (1102), to the filtering component 1005, an intent indicator representing an intent of the top-scoring NLU hypothesis in the NLU results data.

The filtering component 1005 may query (1104) the custom skill component storage 275 for a skill component identifier associated with the context data and the intent indicator. In response, the filtering component 1005 may receive (1012) a first skill component identifier associated with the context data and the intent in the custom skill component storage 275. The filtering component 1005 may send (1014) the first skill component identifier to the orchestrator component 230.

As compared to the above, rather than send the first skill component identifier and the NLU results data to the intent/skill component pair ranker 510, the intent/skill component pair ranker 510 may not be invoked in at least some examples when the context data and the intent are associated with a skill component identifier in the custom skill component storage 275. Thus, according to FIG. 12B, after receiving the first skill component identifier, the orchestrator component 230 may send (1026), to the first skill component 125 corresponding to the received first skill component identifier, the NLU results data (and more particularly a top-scoring NLU hypothesis output by the NLU component 260) without invoking the intent/skill component pair ranker 510. The first skill component 125 may thereafter perform (1028) processing to perform an action responsive to the NLU results data (and more particularly responsive to the top-scoring NLU hypothesis).

As described above, a skill component may be identified (for the purposes of being invoked to respond to a natural language input) based on data stored in the custom skill component storage and/or by an intent/skill component pair ranker. In at least some examples, a skill component may additionally or alternatively be identified based on a wakeword spoken to a device 110. For example, skill components may be associated with respective wakewords. The wakeword, detected by the device 110, may be used as a signal for determine which skill component to invoke in a given instance. In at least some examples, the device 110 may send an indicator (e.g., a wakeword identifier) to the NLP system 120, and the NLP system 120 may use the received indicator to determine which skill component to invoke. In at least some other examples, the audio data 211, sent to the NLP system 120, may include the spoken wakeword. In such examples, the ASR component 250 may generate text data corresponding to the wakeword (and corresponding natural language input). The NLU component 260 may thereafter determine the wakeword portion of the text data. The identified wakeword portion of the text data may thereafter be used to determine which skill component to invoke (e.g., by comparing the identified wakeword against a database of wakewords (or wakeword identifiers) associated with respective skill components (or skill component identifiers).

Figure 13:
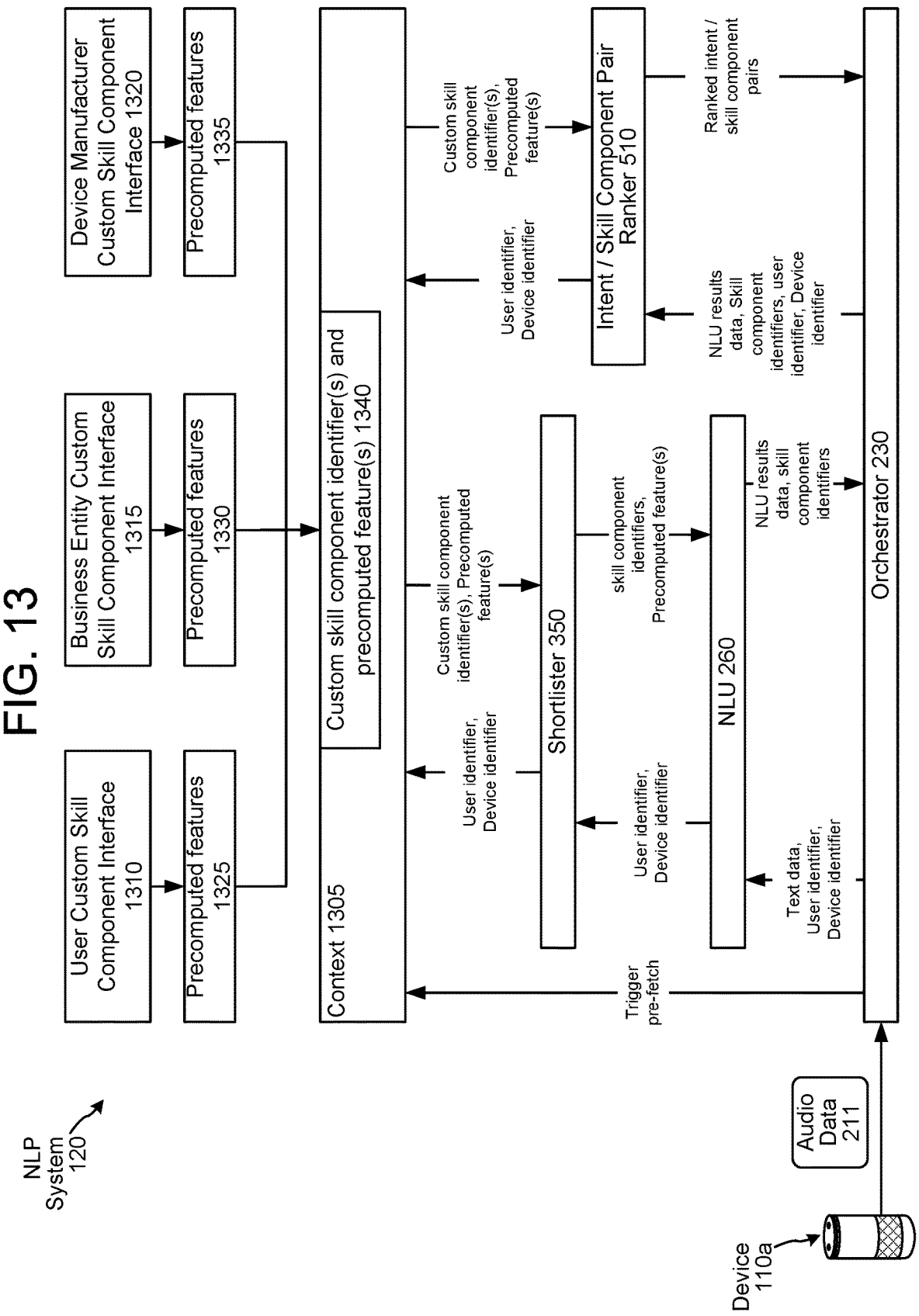
FIG. 13 is a conceptual diagram illustrating how precomputed features may be pre-fetched and independent requested by different components of a NLP system at runtime, in accordance with embodiments of the present disclosure.

FIG. 13 illustrates how precomputed features may be pre-fetched and independently requested by different components of the NLP system 120 at runtime. The NLP system 120 may implement a user custom skill component interface 1310. The user custom skill component interface 1310 may receive various data from a user's device for generating a user custom skill component described herein. The user custom skill component interface 1310 may also be configured to generate and store user custom skill component data representing user-provided data describing functionality for a user custom skill component. The user custom skill component interface 1310 may additionally store context data representing when (e.g., based on geographic location, wakeword, device identifier, etc.) a user custom skill component is to be invoked.

The NLP system 120 may implement a business entity custom skill component interface 1315. The business entity custom skill component interface 1310 may receive various data from a business entity's device for generating a business entity custom skill component described herein. The business entity custom skill component interface 1315 may also be configured to generate and store business entity custom skill component data representing business entity-provided data describing functionality for a business entity custom skill component. The business entity custom skill component interface 1315 may additionally store context data representing when (e.g., based on geographic location, wakeword, device identifier, etc.) a business entity custom skill component is to be invoked.

The NLP system 120 may implement a device manufacturer custom skill component interface 1320. The device manufacturer custom skill component interface 1320 may receive various data from a device manufacturer's device for generating a device manufacturer custom skill component described herein. The device manufacturer custom skill component interface 1320 may also be configured to generate and store device manufacturer custom skill component data representing device manufacturer-provided data describing functionality for a device manufacturer custom skill component. The device manufacturer custom skill component interface 1320 may additionally store context data representing when (e.g., based on geographic location, wakeword, device identifier, etc.) a device manufacturer custom skill component is to be invoked.

Alternatively, the NLP system 120 may implement a single custom skill component interface configured to generate, modify, and store custom skill components specific to users, business entities, and device manufacturers.

When the orchestrator component 230 receives audio data 211 (or text data 213) representing a spoken (or typed) natural language input, the orchestrator component 230 may send data to the context component 1305, with the data triggering the context component 1305 to pre-fetch precomputed features 1340 with respect to custom skill components relevant for responding to the natural language input. The orchestrator component 230 may send the data (causing the context component 1305 to pre-fetch precomputed features 1340) prior to, during, or after ASR processing is performed, but in any event before NLU processing is commenced, in at least some examples.

In response to receiving the data triggering the context component 1305 to pre-fetch the precomputed features, the context component 1305 may determine various context data associated with the natural language input. For example, the context component 1305 may determine a device identifier of the device 110 that captured the natural language input, may determine a user identifier (received from the user recognition component 295) representing a most likely user that provided the natural language input, may determine GPS coordinates of the device 110 when the device 110 captured the natural language input, may determine WiFi network information of a WiFi network to which the device 110 was connected with the device 110 captured the natural language input, may determine context representing the user (corresponding to the user identifier) has provided the NLP system 120 with data representing the user is staying at a hotel for a particular length of time, etc. The context component 1305 may receive the foregoing (and other) context data from various sources including, but not limited to, the user recognition component 295, as input from the user 5 via the device 110, as metadata accompanying the natural language input from the device 110, etc. The context component 1305 may be configured to only receive and store such context data after receiving user permission to do so.

The context component 1305 may query the user custom skill component interface 1310, the business entity custom skill component interface 1315, and the device manufacturer custom skill component interface 1320 for precomputed features corresponding to the determined context data. In response, the user custom skill component interface 1310 may provide the context component 1305 with at least one user custom skill component identifier and portions of the determined context data associated with the user custom skill component identifier; the business entity custom skill component interface 1315 may provide the context component 1305 with at least one business entity custom skill component identifier and portions of the determined context data associated with the business entity custom skill component identifier; and/or the device manufacturer custom skill component interface 1320 may provide the context component 1305 with at least one device manufacturer custom skill component identifier and portions of the determined context data associated with the device manufacturer custom skill component identifier. The context component 1305 may store the received custom skill component identifier(s) and corresponding precomputed feature(s) (illustrated as 1340).

Prior to or after the context component 1305 stores the received custom skill component identifier(s) and corresponding precomputed feature(s), the orchestrator component 230 may send, to the NLU component 260, text data representing the natural language input, and a user identifier (output by the user recognition component 295 as representing a most likely user that provided the natural language input) and/or a device identifier representing the device 110 that captured the natural language input. The NLU component 260 may send the user identifier and/or device identifier to the shortlister component 350. The shortlister component 350 may send the user identifier and/or the device identifier to the context component 1305.

The context component 1305 may determine at least one pre-fetched custom skill component identifier(s) associated with the user identifier and/or device identifier, and may determine a pre-fetched precomputed feature(s) associated with the determined at least one pre-fetched custom skill component identifier(s). The context component 1305 may send the custom skill component identifier(s) and precomputed feature(s) to the shortlister component 350.

The shortlister component 350 may perform operations described herein based on the received custom skill component identifier(s) and precomputed feature(s). For example, in response to receiving the custom skill component identifier(s) and precomputed feature(s), the shorlister component 350 may heavily weight a score(s) associated with the custom skill component identifier(s) such that the custom skill component identifier(s) will be ranked highly in the selected domains N-best list data 415 output by the shortlister component 350.

The shortlister component 350 may send the selected domains N-best list data 415, and precomputed features associated with custom skill component identifiers represented in the selected domains N-best list data 415, to the NLU component 260. The NLU component 260 may perform various operations (e.g., named entity recognition, intent classification, entity resolution, etc.) based on the received custom skill component identifier(s) and one or more precomputed features corresponding to the custom skill component identifier(s). For example, in response to receiving the custom skill component identifier(s) and precomputed feature(s), the NLU component 260 may heavily weight a score(s) associated with a NLU hypothesis associated with a custom skill component identifier(s) such that the NLU hypothesis will be ranked highly in the NLU results data 485 output by the NLU component 260.

The NLU component 260 sends the NLU results data, and associated skill component identifiers, to the orchestrator component 230. The orchestrator component 230 may send, to the intent/skill component pair ranker 510, the NLU results data and the skill component identifier(s), and the user identifier and/or device identifier. The intent/skill component pair ranker 510 may send the user identifier and/or the device identifier to the context component 1305.

The context component 1305 may determine the already pre-fetched custom skill component identifier(s) associated with the user identifier and/or device identifier, and may determine the already pre-fetched precomputed feature(s) associated with the determined at least one pre-fetched custom skill component identifier(s). The context component 1305 may send the custom skill component identifier(s) and precomputed feature(s) to the intent/skill component pair ranker 510.

The intent/skill component pair ranker 510 may perform operations described herein based on the received custom skill component identifier(s) and precomputed feature(s). For example, in response to receiving the custom skill component identifier(s) and precomputed feature(s), the intent/skill component pair ranker 510 may heavily weight a score(s) associated with the custom skill component identifier(s) such that the custom skill component identifier(s) will be ranked highly in the ranked intent/skill component pairs 535 output by the intent/skill component pair ranker 510.

The intent/skill component pair ranker 510 may send, to the orchestrator component 230, the ranked intent/skill component pairs 535. Thereafter, operations, described herein as being performed downstream of intent/skill component pair ranker processing, may be performed.

Figure 14:
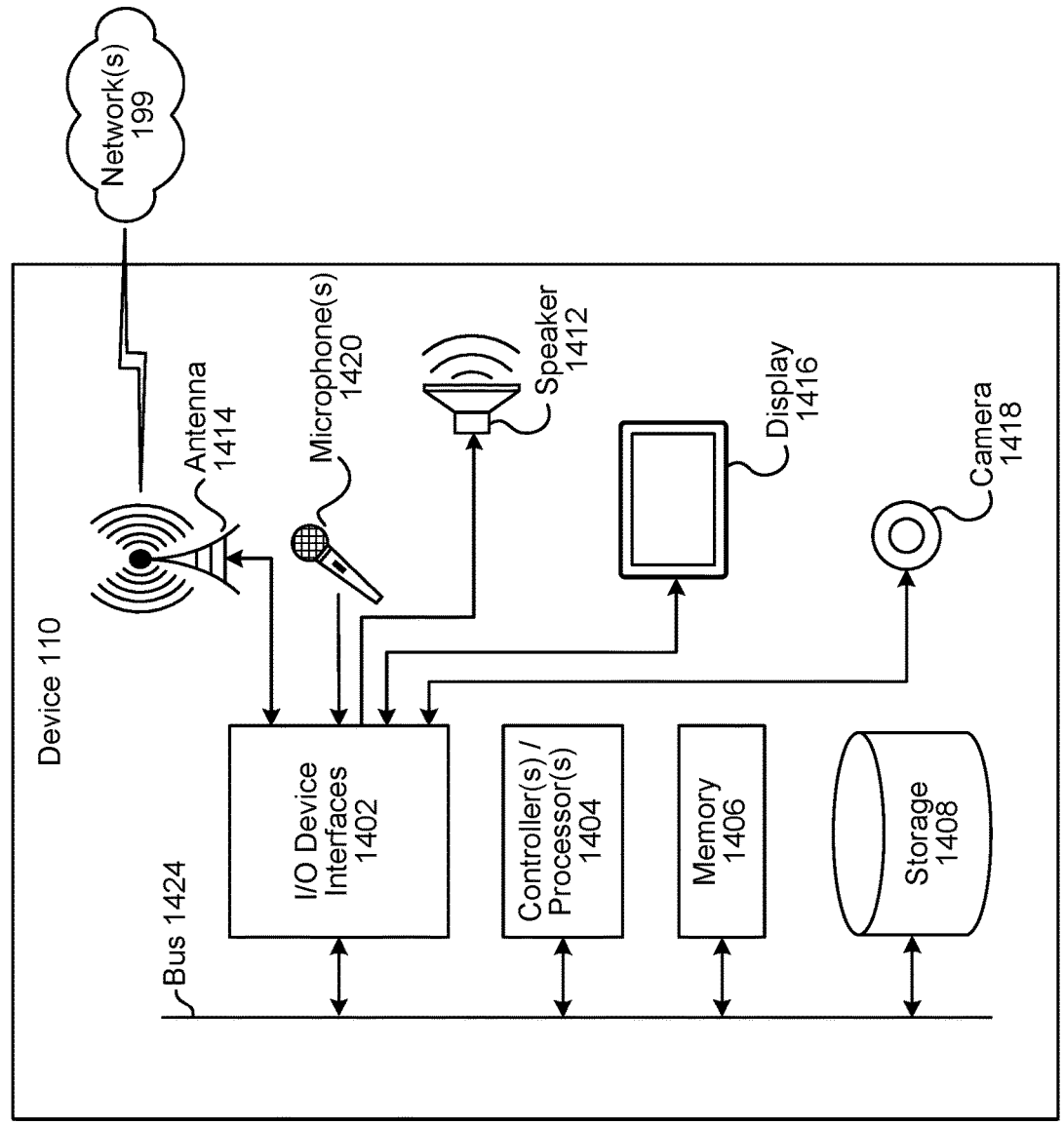
FIG. 14 is a block diagram conceptually illustrating example components of a device, in accordance with embodiments of the present disclosure.
Figure 15:
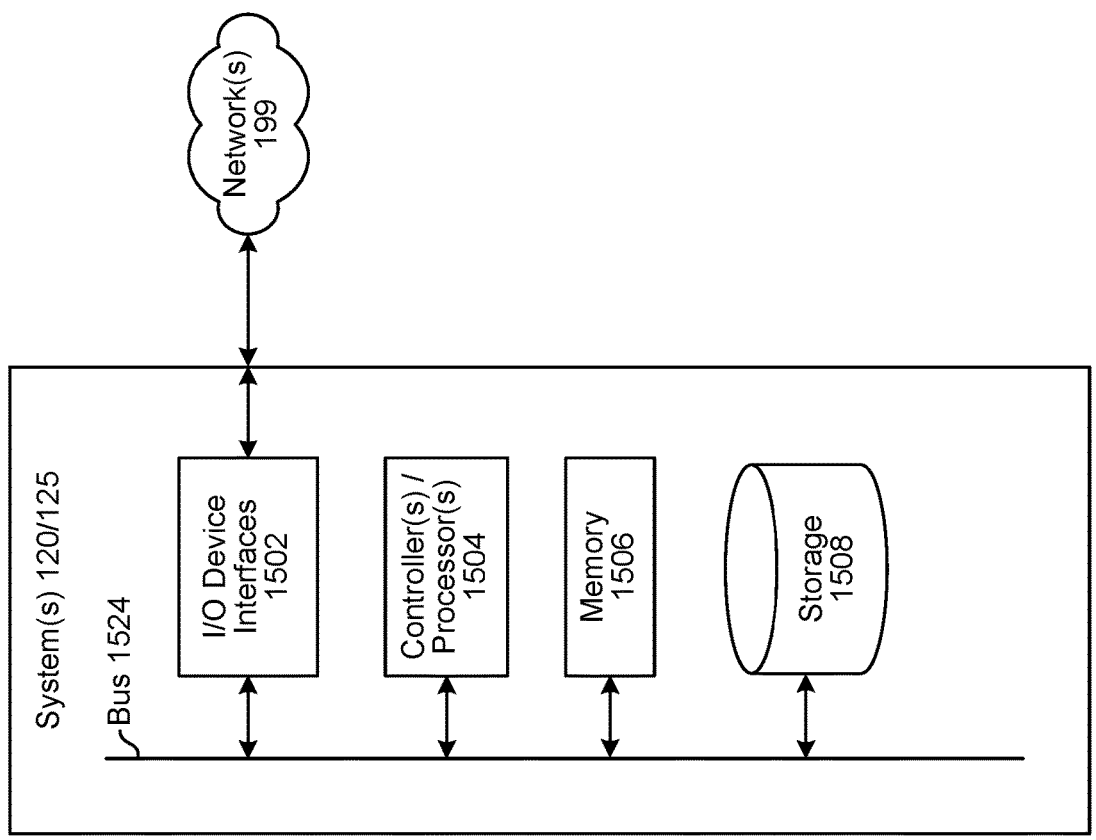
FIG. 15 is a block diagram conceptually illustrating example components of a system, in accordance with embodiments of the present disclosure.

FIG. 14 is a block diagram conceptually illustrating a device 110 that may be used with the system. FIG. 15 is a block diagram conceptually illustrating example components of a remote device, such as the NLP system 120, which may assist with ASR processing, NLU processing, etc., and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill components 125, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the natural language processing system 120, or a skill component 125 may include their own dedicated processors, memory, and/or storage. Alternatively, one or more of the components of the device(s) 110, the natural language processing system 120, or a skill component 125 may utilize the I/O interfaces (1402/1502), processor(s) (1404/1504), memory (1406/1506), and/or storage (1408/1508) of the device(s) 110, natural language processing system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill component 125, as described herein, are illustrative, and may be located as a stand-alone device or may be included, in whole or in part, as a component of a larger device or system.

Figure 16:
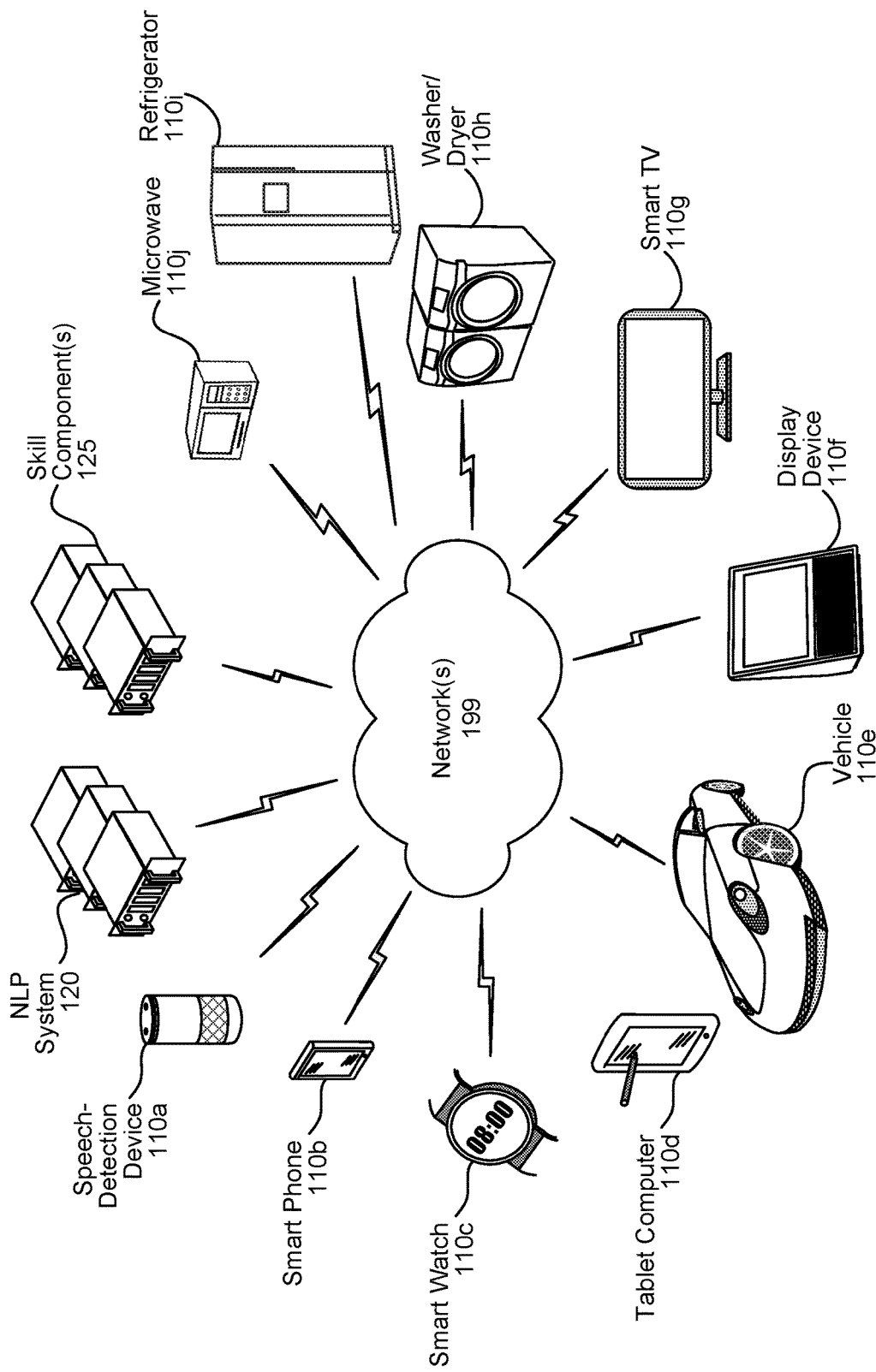
FIG. 16 illustrates an example of a computer network for use with the overall system, in accordance with embodiments of the present disclosure.

As illustrated in FIG. 16, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, and/or a microwave 110*j* may be connected to the network(s) 199 through a wireless service provider, over a WiFi or cellular network connection, or the like. Other devices are included as network-connected support devices, such as the natural language processing system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   during a first time period:
   receiving, from a first component corresponding to a device manufacturer, an indication of a first action to be supported by a skill component;
   determining a first natural language understanding (NLU) intent corresponding to the first action;
   generating a first skill component configured to process NLU results data corresponding to the first NLU intent, the first skill component corresponding to a first skill identifier;
   receiving, from the first component, a device identifier corresponding to a user device manufactured by the device manufacturer;
   storing first data associating the first skill identifier, the device identifier, and the first NLU intent;
   during a second time period after the first time period:
   receiving, from the user device, first audio data corresponding to a first utterance;
   after receiving the first audio data, sending, to a context component, second data causing the context component to pre-fetch at least one skill identifier associated with the device identifier, the at least one skill identifier comprising the first skill identifier;
   generating first NLU results data representing the first utterance, the first NLU results data including the first NLU intent, wherein the first NLU intent is executable by the first skill component and a second skill component;
   receiving, by a skill arbitration component, the first skill identifier from the context component;
   assigning, by the skill arbitration component, a first priority to the first skill component based at least in part on the skill arbitration component receiving the first skill identifier from the context component;
   assigning, by the skill arbitration component, a second priority to the second skill component, the second priority being less than the first priority;
   sending the first NLU results data to the first skill component;
   receiving, from the first skill component, first text data representing a response to the first utterance;
   performing text-to-speech (TTS) processing on the first text data to generate second audio data; and
   sending the second audio data to the user device for output.

2. The method of claim 1, further comprising:
   during the second time period:
   determining, by an NLU component, a first NLU hypothesis associated with the first skill component;
   determining, by the NLU component, a second NLU hypothesis associated with a third skill component;
   receiving, by the NLU component, the first skill identifier from the context component;
   generating, by the NLU component, a first NLU score for the first NLU hypothesis based at least in part on the NLU component receiving the first skill identifier from the context component; and
   generating, by the NLU component, a second NLU score for the second NLU hypothesis, the second NLU score being less than the first NLU score.

3. The method of claim 1, further comprising:
   during a third time period:
   receiving, from a second device associated with business entity, a second indication of a second action to be supported by a skill component;
   receiving, from the second device, global positioning system (GPS) coordinates corresponding to the business entity;
   determining a second NLU intent corresponding to the second action;
   generating a third skill component configured to process NLU results data corresponding to the second NLU intent, the third skill component corresponding to a second skill identifier;
   storing third data associating the second skill identifier, the GPS coordinates, and the second NLU intent;
   during a fourth time period after the third time period:
   receiving, from a second user device, third audio data corresponding to a second utterance;
   receiving, from the second user device, metadata representing the second user device was located at the GPS coordinates when the second user device received the second utterance;
   after receiving the third audio data, sending, to the context component, third data causing the context component to pre-fetch at least one skill identifier associated with the GPS coordinates, the at least one skill identifier comprising the second skill identifier;
   generating second NLU results data representing the second utterance, the second NLU results data including the second NLU intent executable by the third skill component and a fourth skill component configured to perform a third action in response to the second utterance;
   receiving, by the skill arbitration component, the second skill identifier from the context component;
   assigning, by the skill arbitration component, a third priority to the third skill component based at least in part on the skill arbitration component receiving the second skill identifier from the context component;
   assigning, by the skill arbitration component, a fourth priority to the fourth skill component;
   based at least in part on the third priority and the fourth priority, sending the second NLU results data to the third skill component;

receiving, from the third skill component, second text data representing a response to the second utterance;

performing text-to-speech (TTS) processing on the second text data to generate fourth audio data; and sending the fourth audio data to the second user device for output.

4. The method of claim 1, further comprising:

during a third time period:
- receiving, from a second device associated with a same user profile as the user device, a second indication of a second action to be supported by a skill component;
- determining the first NLU intent corresponds to the second action;
- generating a third skill component configured to process NLU results data corresponding to the first NLU intent, the third skill component corresponding to a second skill identifier;
- determining a user identifier associated with the second device;
- storing third data associating the second skill identifier, the user identifier, and the first NLU intent;

during the second time period:
- determining, by the context component in response to receiving the second data, the second skill identifier;
- receiving, by the skill arbitration component, the second skill identifier from the context component;
- assigning, by the skill arbitration component, a third priority to the third skill component based at least in part on the skill arbitration component receiving the second skill identifier from the context component;
- assigning, by the skill arbitration component, a second priority to the second skill component, the second priority being less than the first priority; and
- based at least in part on the first priority and the third priority, sending the first NLU results data to the first skill component.

5. A method comprising:

receiving, from a first device, first data corresponding to a first natural language input;

sending, to a context component, second data causing the context component to pre-fetch context data corresponding to the first natural language input, the context data comprising at least one skill identifier associated with a geographic location of the first device, the at least one skill identifier comprising a first skill identifier corresponding to a business entity located at the geographic location;

generating first natural language understanding (NLU) results data representing the first natural language input;

receiving, by a skill arbitration component, the context data from the context component;

assigning, by the skill arbitration component, a first priority to the first skill identifier;

assigning, by the skill arbitration component, a second priority to a second skill identifier, the first priority being lower than the second priority based at least in part on the first skill identifier being represented in the context data;

sending the first NLU results data to a first skill component corresponding to the first skill identifier;

receiving, from the first skill component, first text data representing a response to the first natural language input; and causing at least one of:
- the first text data to be output; or
- synthesized speech, corresponding to the first text data, to be output.

6. The method of claim 5, further comprising:

prior to receiving the first data:
- receiving, from a second device corresponding to a business entity, second data representing a first action is to be supported by the first skill component;
- after receiving the second data, generating the first skill component;
- receiving, from the second device, an indication that the first skill component is associated with a business establishment corresponding to the geographic location; and
- storing third data associating the first skill component and the geographic location.

7. The method of claim 5, further comprising:

receiving, from a second device corresponding to a device manufacturer, second data representing a first action is to be supported by a third skill component;

after receiving the second data, generating the third skill component;

determining a first NLU intent corresponding to the first action;

receiving, from the second device, a plurality of device identifiers corresponding a plurality of devices manufactured by the device manufacturer; and storing third data associating the plurality of device identifiers, the first NLU intent, and the third skill component.

8. The method of claim 5, further comprising:

receiving, from a second device, second data representing a first action is to be supported by a third skill component;

after receiving the second data, generating the third skill component;

determining a first NLU intent corresponding to the first action;

determining a user identifier associated with the second device; and storing third data associating the user identifier, the first NLU intent, and the third skill component.

9. The method of claim 5, further comprising:

determining, by an NLU component, a first NLU hypothesis associated with the first skill component;

determining, by the NLU component, a second NLU hypothesis associated with a third skill component;

receiving, by the NLU component, the context data from the context component;

generating, by the NLU component, a first NLU score for the first NLU hypothesis; and generating, by the NLU component, a second NLU score for the second NLU hypothesis, the second NLU score being less than the first NLU score based at least in part on the first skill identifier being represented in the context data.

10. The method of claim 5, wherein the first data is audio data corresponding to a first spoken utterance, and wherein the method further comprises:

performing automatic speech recognition (ASR) processing on the audio data to generate text data; and performing NLU processing on the text data to generate the NLU results data.

11. The method of claim 10, wherein the second data is sent to the context component:

prior to or while ASR processing is being performed; and prior to NLU processing being performed.

12. The method of claim 5, wherein the context data further comprises a third skill identifier corresponding to at least one of a user identifier corresponding to the first natural language input, a wakeword detected by the first device, or a device identifier corresponding to the first device.

13. A system comprising:
at least one processor; and
at least one memory comprising instructions that, when executed by the at least one processor, cause the system to:
receive, from a first device, first data corresponding to a first natural language input;
send, to a context component, second data causing the context component to pre-fetch context data corresponding to the first natural language input, the context data comprising at least one skill identifier associated with a geographic location of the first device, the at least one skill identifier comprising a first skill identifier corresponding to a business entity located at the geographic location;
generate first natural language understanding (NLU) results data representing the first natural language input;
receive, by a skill arbitration component, the context data from the context component;
assign, by the skill arbitration component, a first priority to the first skill identifier;
assign, by the skill arbitration component, a second priority to a second skill identifier, the first priority being lower than the second priority based at least in part on the first skill identifier being represented in the context data;
send the first NLU results data to a first skill component corresponding to the first skill identifier;
receive, from the first skill component, first text data representing a response to the first natural language input; and
cause at least one of:
the first text data to be output; or
synthesized speech, corresponding to the first text data, to be output.

14. The system of claim 13, wherein the at least one memory further comprises instructions that, when executed by the at least one processor, further cause the system to:
prior to receiving the first data:
receive, from a second device corresponding to a business entity, second data representing a first action is to be supported by the first skill component;
after receiving the second data, generate the first skill component;
receive, from the second device, an indication that the first skill component is associated with a business establishment corresponding to the geographic location; and
store third data associating the first skill component and the geographic location.

15. The system of claim 13, wherein the at least one memory further comprises instructions that, when executed by the at least one processor, further cause the system to:
receive, from a second device corresponding to a device manufacturer, second data representing a first action is to be supported by a third skill component;
after receiving the second data, generate the third skill component;
determine a first NLU intent corresponding to the first action;
receive, from the second device, a plurality of device identifiers corresponding a plurality of devices manufactured by the device manufacturer; and
store third data associating the plurality of device identifiers, the first NLU intent, and the third skill component.

16. The system of claim 13, wherein the at least one memory further comprises instructions that, when executed by the at least one processor, further cause the system to:
receive, from a second device, second data representing a first action is to be supported by a third skill component;
after receiving the second data, generate the third skill component;
determine a first NLU intent corresponding to the first action;
determine a user identifier associated with the second device; and
store third data associating the user identifier, the first NLU intent, and the third skill component.

17. The system of claim 13, wherein the at least one memory further comprises instructions that, when executed by the at least one processor, further cause the system to:
determine, by an NLU component, a first NLU hypothesis associated with the first skill component;
determine, by the NLU component, a second NLU hypothesis associated with a third skill component;
receive, by the NLU component, the context data from the context component;
generate, by the NLU component, a first NLU score for the first NLU hypothesis; and
generate, by the NLU component, a second NLU score for the second NLU hypothesis, the second NLU score being less than the first NLU score based at least in part on the first skill identifier being represented in the context data.

18. The system of claim 13, wherein the first data is audio data corresponding to a first spoken utterance, and wherein the at least one memory further comprises instructions that, when executed by the at least one processor, further cause the system to:
perform automatic speech recognition (ASR) processing on the audio data to generate text data; and
perform NLU processing on the text data to generate the NLU results data.

19. The system of claim 18, wherein the second data is sent to the context component:
prior to or while ASR processing is being performed; and
prior to NLU processing being performed.

20. The system of claim 13, wherein the context data further comprises a third skill identifier corresponding to at least one of a user identifier corresponding to the first natural language input, a wakeword detected by the first device, or a device identifier corresponding to the first device.

* * * * *